US012781521B2

(12) United States Patent
Ai et al.

(10) Patent No.: US 12,781,521 B2
(45) Date of Patent: Nov. 3, 2026

(54) PLATFORM ASSEMBLIES FOR MONOPOLE ANTENNAS

(71) Applicant: Outdoor Wireless Networks LLC, Claremont, NC (US)

(72) Inventors: Bin Ai, Suzhou (CN); Jyoti Ojha, Southlake, TX (US); Brian Cross, Double Oak, TX (US); Charles J. Mann, Omaha, NE (US)

(73) Assignee: OUTDOOR WIRELESS NETWORKS LLC, Richardson, TX (US)

( * ) Notice: Subject to any disclaimer, the term of this patent is extended or adjusted under 35 U.S.C. 154(b) by 652 days.

(21) Appl. No.: 18/321,465

(22) Filed: May 22, 2023

(65) Prior Publication Data

US 2023/0399859 A1 Dec. 14, 2023

Related U.S. Application Data

(60) Provisional application No. 63/375,920, filed on Sep. 16, 2022, provisional application No. 63/351,468, filed on Jun. 13, 2022.

(51) Int. Cl.

| | |
|---|---|
| ***E04G 3/24*** | (2006.01) |
| ***E04G 5/14*** | (2006.01) |
| ***E04G 7/02*** | (2006.01) |
| ***H01Q 1/12*** | (2006.01) |
| ***H01Q 1/24*** | (2006.01) |

(52) U.S. Cl.

CPC ............... *E04G 3/243* (2013.01); *E04G 7/02* (2013.01); *H01Q 1/1242* (2013.01); *E04G 5/14* (2013.01); *H01Q 1/246* (2013.01)

(58) Field of Classification Search

CPC .. E04G 3/243; E04G 7/02; E04G 5/14; E04G 5/08; E04G 7/14; E04G 1/36; E04G 1/38; E04G 1/152; H01Q 1/1242; H01Q 1/246; H01Q 1/1228

See application file for complete search history.

(56) References Cited

U.S. PATENT DOCUMENTS 4,056,902 A * 11/1977 Ziegler, Jr. .............. E04H 15/04 52/73
5,467,955 A * 11/1995 Beyersmith .......... H01Q 1/1242 343/890
5,787,673 A * 8/1998 Noble ................... E04H 12/085 52/114
5,853,066 A * 12/1998 Gohn .................... A01M 31/02 182/20

(Continued)

FOREIGN PATENT DOCUMENTS

WO WO-03009416 A1 * 1/2003 ........... H01Q 1/1242

*Primary Examiner* — Brian D Mattei
*Assistant Examiner* — Kathleen M. McFarland
(74) *Attorney, Agent, or Firm* — Myers Bigel, P.A.

(57) ABSTRACT

The present disclosure is directed to a platform assembly. The platform assembly includes a plurality of T-arm assemblies, each having a platform frame, an adjustable arm member, and a pair of locking brackets. The adjustable arm member is configured to slide within a channel in the platform frame to accommodate different diameters along a monopole, and secure the T-arm assemblies thereto. Other platform and antenna assemblies are described herein.

16 Claims, 36 Drawing Sheets

(56) References Cited

U.S. PATENT DOCUMENTS

| | | | | |
|---|---|---|---|---|
| 5,954,305 | A * | 9/1999 | Calabro | H01Q 1/1242 343/890 |
| 6,028,566 | A * | 2/2000 | Pennell | H01Q 1/246 248/219.3 |
| 6,229,497 | B1 * | 5/2001 | McCracken | E04G 21/3238 343/890 |
| 6,563,475 | B2 * | 5/2003 | Ianello | H01Q 1/1242 343/890 |
| 6,668,977 | B2 * | 12/2003 | Arsenault | A01M 31/02 182/187 |
| 6,725,972 | B1 * | 4/2004 | Krier | A01M 31/02 182/187 |
| 8,272,479 | B1 * | 9/2012 | Leach | A01M 31/02 182/187 |
| 9,091,037 | B2 * | 7/2015 | Fairbairn | H01Q 1/1242 |
| 9,385,413 | B2 * | 7/2016 | Pass | H01Q 1/1207 |
| 9,832,989 | B2 * | 12/2017 | Hillis | E06C 1/10 |
| 9,853,346 | B2 * | 12/2017 | Skrepcinski | H01Q 1/1228 |
| 10,170,818 | B2 * | 1/2019 | Pass | H01Q 1/1242 |
| 11,387,538 | B2 * | 7/2022 | Liu | H01Q 1/1228 |
| 11,462,813 | B2 * | 10/2022 | Palmer | H01Q 1/125 |
| 11,495,872 | B2 * | 11/2022 | Ojha | H01Q 1/1242 |
| 12,046,795 | B2 * | 7/2024 | Cross | H01Q 1/1207 |
| 12,077,973 | B2 * | 9/2024 | Burnett | H01Q 1/1207 |
| 12,116,788 | B1 * | 10/2024 | Chapman | E04G 5/061 |
| 12,224,478 | B2 * | 2/2025 | Severin | H01Q 1/12 |
| 12,385,262 | B2 * | 8/2025 | Heath | H01Q 1/1242 |
| 2002/0053996 | A1 * | 5/2002 | Ianello | H01Q 1/1242 343/890 |
| 2011/0279347 | A1 * | 11/2011 | Pass | E04G 3/243 343/890 |
| 2012/0243955 | A1 * | 9/2012 | Cross | B23B 49/02 408/72 B |
| 2014/0115978 | A1 * | 5/2014 | Fairbairn | H01Q 1/12 52/298 |
| 2015/0152653 | A1 * | 6/2015 | Dolan | E04G 1/36 182/113 |
| 2016/0211569 | A1 * | 7/2016 | Skrepcinski | H01Q 1/1228 |
| 2016/0276732 | A1 * | 9/2016 | Pass | H01Q 1/1242 |
| 2016/0330951 | A1 * | 11/2016 | Hillis | E06C 1/10 |
| 2017/0343156 | A1 * | 11/2017 | Franceschino | E04G 5/067 |
| 2019/0123419 | A1 * | 4/2019 | Pass | H01Q 1/1207 |
| 2019/0348742 | A1 * | 11/2019 | Palmer | H01Q 1/1228 |
| 2020/0123790 | A1 * | 4/2020 | de La Soujeole | E04G 5/08 |
| 2020/0321679 | A1 * | 10/2020 | Liu | H01Q 1/1228 |
| 2021/0005950 | A1 * | 1/2021 | Ojha | H01Q 1/1228 |
| 2021/0376444 | A1 * | 12/2021 | Heath | H01Q 1/1242 |
| 2022/0311121 | A1 * | 9/2022 | Cross | H01Q 1/1207 |
| 2023/0024333 | A1 * | 1/2023 | Ojha | H01Q 1/1228 |
| 2023/0167648 | A1 * | 6/2023 | Burnett | E04G 3/24 52/651.1 |
| 2023/0178873 | A1 * | 6/2023 | Severin | H01Q 1/12 343/878 |
| 2023/0399859 | A1 * | 12/2023 | Ai | E04G 1/152 |
| 2024/0039264 | A1 * | 2/2024 | Wang | H01Q 1/1228 |
| 2024/0127722 | A1 * | 4/2024 | Kim | H01Q 1/1228 |
| 2024/0363992 | A1 * | 10/2024 | Haines | H01Q 1/1228 |
| 2025/0067067 | A1 * | 2/2025 | Bu | E04G 5/067 |
| 2025/0105610 | A1 * | 3/2025 | Wu | H02G 3/32 |
| 2025/0337150 | A1 * | 10/2025 | Haines | H01Q 1/12 |

* cited by examiner

PLATFORM ASSEMBLIES FOR MONOPOLE ANTENNAS

RELATED APPLICATION(S)

The present claims priority from and the benefit of U.S. Provisional Patent Application Ser. No. 63/351,468, filed Jun. 13, 2022, and U.S. Provisional Patent Application Ser. No. 63/375,920, filed Sep. 16, 2022, the disclosures of which are hereby incorporated herein in their entireties.

FIELD

The invention relates generally to telecommunications equipment, and more particularly, platform assemblies for monopole antenna structures and related antenna assemblies.

BACKGROUND

Various types of towers have been constructed for the purpose of supporting one or more antennas, such as those for broadcasting television and radio signals. Some towers are specifically designed for transmitting and receiving cellular telephone signals and other types of radio frequency (RF) signals. As wireless data service demands have grown, a conventional response has been to increase the number and capacity of conventional cellular Base Stations (Macro-Cells). Such Macro-Cells are typically mounted on antenna towers. A conventional antenna tower has three or four legs on which antennas and supporting remote radio units (RRUs) are mounted. However, in some environments structures known as "monopoles" are used as mounting structures. A typical monopole 10 with antennas 20 mounted on mounting frames 30 is shown in FIG. 1. Monopoles are typically employed when fewer antennas/RRUs are to be mounted, and/or when a structure of less height is required.

RF towers (including monopoles) are often designed to allow a person to climb to the top and remain there to install and/or repair RF antennas (e.g., cellular antennas) and other equipment connected to the tower. Platforms 40 are typically mounted near the tops of RF towers (e.g., cellular towers) for supporting workers who may be responsible for installing and/or maintaining RF antennas (e.g., cellular antennas). Such platforms are designed to support the weight of a human and may also be used to support a number of the RF antennas. A monopole platform is a common platform design that can mount multiple different communication devices at the same time. This platform can be fixed on a monopole 10 at different heights. Since monopoles may have different diameters, and the diameter of a monopole may differ at different heights, the ring mount 70, 70' used for securing the platform to the monopole will change with the diameter of the pole and undertake the main load bearing function.

Typically, the monopole platform is fixed on the monopole via a support member or T-arm that is welded to a platform frame. See, e.g., U.S. Pat. No. 9,385,413 to Pass et al., the disclosure of which is hereby incorporated herein in its entirety. Since the T-arm is welded to the platform frame, the platform can only be secured at a specific height along the monopole. In some instances, as shown in FIG. 2 and FIG. 3, a retractable or telescoping T-arm 50, 60 coupled to the platform 40 may be used to accommodate the different diameters along the monopole 10. There may be a need for alternative monopole platform assemblies and allow for easy fabrication and more efficient installation, while reducing manufacturing costs.

SUMMARY

A first aspect of the present invention is directed to a platform assembly. The platform assembly includes a plurality of T-arm assemblies. Each T-arm assembly includes a platform frame, an adjustable arm member, and a pair of locking brackets. The platform frame includes a pair of support members, each support member having a respective aperture therethrough, a plurality of brace members coupled to and extending between the pair of support members, at least two of the brace members residing on opposing sides of the apertures to form a channel extending between the support members, at least two grating edge members coupled to the support members, and a grating coupled to the at least two grating edge members. The adjustable arm member extends through the apertures in each support member and is configured to slide within the channel to accommodate for different diameters along a monopole. Each locking bracket is coupled to a respective support member and configured to secure the adjustable arm member in a desired position within the channel.

Another aspect of the present invention is directed to an antenna assembly. The antenna assembly includes a monopole, a ring mount secured to the monopole, and a platform assembly including a plurality of T-arm assemblies. Each T-arm assembly includes a platform frame, an adjustable arm member, and a pair of locking brackets. The platform frame includes a pair of support members, each support member having a respective aperture therethrough, a plurality of brace members coupled to and extending between the pair of support members, at least two of the brace members residing on opposing sides of the apertures to form a channel extending between the support members, at least two grating edge members coupled to the support members, and a grating coupled to the at least two grating edge members. The adjustable arm member extends through the apertures in each support member and has a mounting bracket at one end. The adjustable arm member is configured to slide within the channel to accommodate for different diameters along a monopole. Each locking bracket is coupled to a respective support member and configured to secure the adjustable arm member in a desired position within the channel, and each adjustable arm is secured to the ring mount via the respective mounting bracket.

Another aspect of the present invention is directed to a platform assembly. The platform assembly includes a plurality of T-arm assemblies and one or more grating sections. Each T-arm assembly includes a platform frame, an adjustable arm member, and a pair of locking brackets. The platform frame includes a pair of support members, each support member having a respective aperture therethrough, a plurality of brace members coupled to and extending between the pair of support members, at least two of the brace members residing on opposing sides of the apertures to form a channel extending between the support members, at least two grating edge members coupled to the support members, and a grating coupled to the at least two grating edge members. The adjustable arm member extends through the apertures in each support member and is configured to slide within the channel to accommodate for different diameters along a monopole. Each locking bracket is coupled to a respective support member and configured to secure the adjustable arm member in a desired position within the channel. Each grating section has a frame including a pair of support members, at least two grating edge members coupled to the support members, and a grating coupled to the at least two grating edge members. Each grating section resides between two adjustable T-arm assemblies.

Another aspect of the present invention is directed to a platform assembly. The platform assembly includes a plurality of platform sub-assemblies and one or more grating sections. Each grating section includes a frame comprising a pair of support members, at least two grating edge members coupled to the support members, and a grating coupled to the at least two grating edge members. Each grating section resides between two platform sub-assemblies and is pivotably coupled to the platform sub-assemblies.

Another aspect of the present invention is directed to a platform assembly. The platform assembly includes a plurality of platform sub-assemblies, one or more grating sections, and a pivot bracket assembly. Each grating section includes a frame comprising a pair of support members, at least two grating edge members coupled to the support members, and a grating coupled to the at least two grating edge members. The pivot bracket assembly includes an identical pair of main bracket members, each main bracket member having an L-shaped profile with a first longer segment and a second shorter segment. The first longer segment includes a first and a second aperture and the second shorter segment includes a third aperture. The third aperture of one of the main bracket members is configured to align with the first aperture of the other main bracket member and a first fastener is received through the aligned apertures to form a hinge rotation axis. Each grating section resides between two platform sub-assemblies and is pivotably coupled to the platform sub-assemblies about the hinge rotation axis.

Another aspect of the present invention is directed to a platform assembly. The platform assembly includes a plurality of T-arm assemblies, each T-arm assembly including a platform frame, a pair of locking brackets, an adjustable arm member. The platform frame includes a pair of support members, at least one brace member coupled to and extending between the pair of support members, at least two grating edge members coupled to the support members, and a grating coupled to the at least two grating edge members. Each locking bracket is coupled to a respective support member. The adjustable arm member configured to slide between the pair of locking brackets and relative to the platform frame to accommodate for different diameters along a monopole and each locking bracket is configured to secure the adjustable arm member in a desired position relative to the platform frame.

Another aspect of the present invention is directed to a platform assembly. The platform assembly includes a plurality of T-arm assemblies and one or more grating sections. Each T-arm assembly includes a platform frame, a pair of locking brackets and an adjustable arm member. The platform frame includes a pair of support members, at least one brace member coupled to and extending between the pair of support members, at least two grating edge members coupled to the support members, and a grating coupled to the at least two grating edge members. Each locking bracket coupled to a respective support member. The adjustable arm member configured to slide between the pair of locking brackets and relative to the platform frame to accommodate for different diameters along a monopole and each locking bracket is configured to secure the adjustable arm member in a desired position relative to the platform frame. Each grating section includes a frame including a pair of support members, at least two grating edge members coupled to the support members, and a grating coupled to the at least two grating edge members. Each grating section resides between two adjustable T-arm assemblies.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim, accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1:
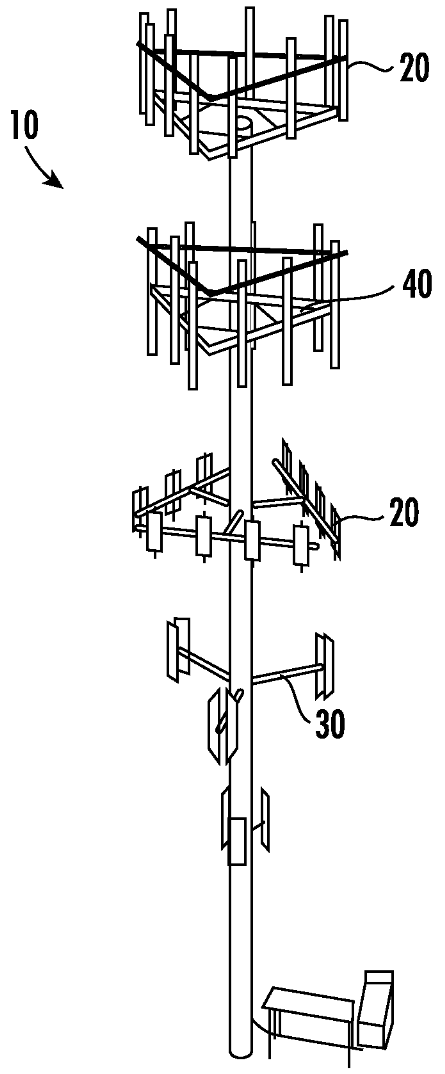
FIG. 1 PRIOR ART
FIG. 1 is a front perspective view of a conventional monopole with antenna frames and accompanying antennas mounted thereon.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the figures, certain layers, components, or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer, or section. Thus, a first element, component, region, layer, or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Figure 4:
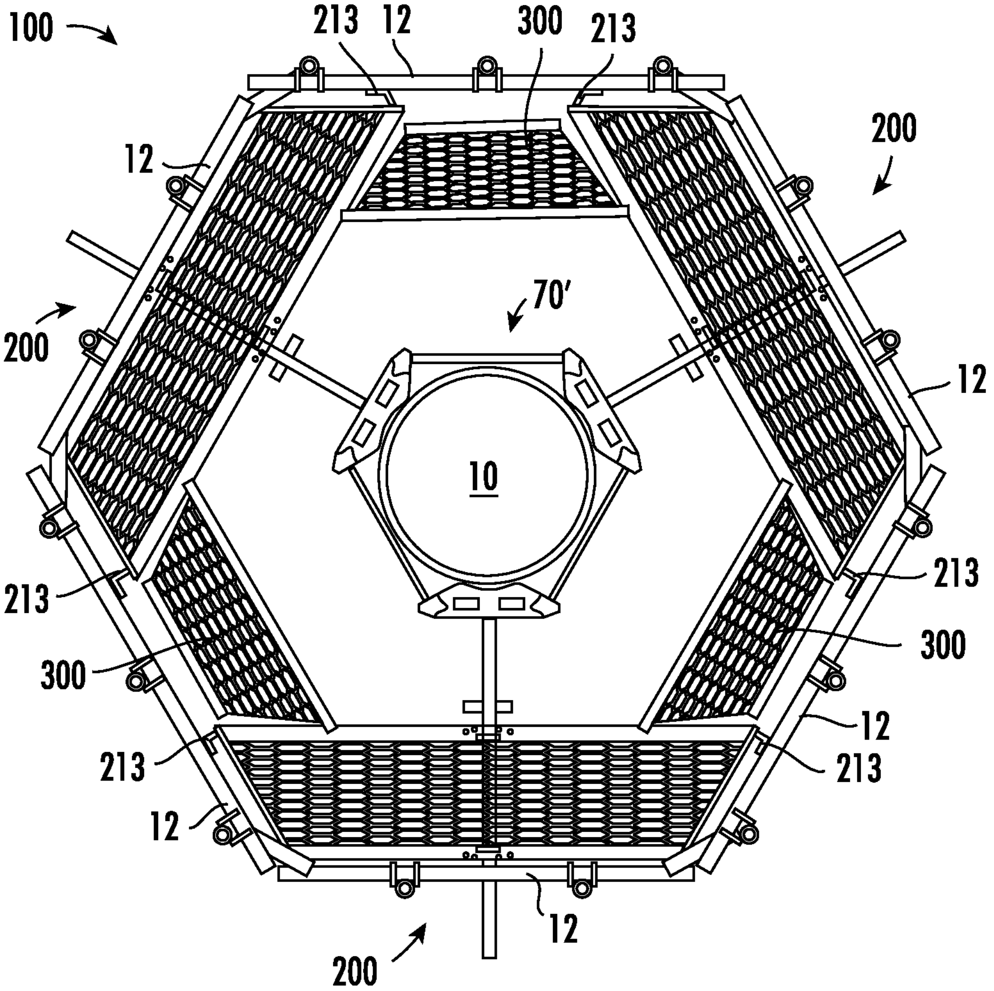
FIG. 4 is a top view of a monopole platform assembly according to embodiments of the present invention.

Referring now to the figures, a platform assembly according to embodiments of the present invention, designated broadly at 100, is illustrated in FIG. 4. As shown in FIG. 4, the platform assembly 100 is configured to be secured to a monopole 10 via an existing ring mount (e.g., ring mount 70'). The platform assembly 100 includes a plurality of adjustable T-arm assemblies 200. In some embodiments, the platform assembly 100 may further include one or more grating sections 300. The T-arm assemblies 200 and grating sections 300 are described in further detail below.

Figure 8A:
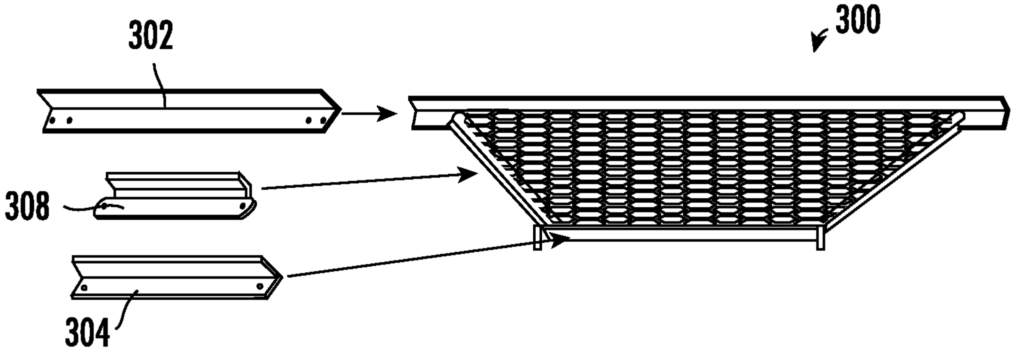
FIGS. 8A-8C illustrate the modular design of the adjustable T-arm assembly according to embodiments of the present invention.
Figure 8B:
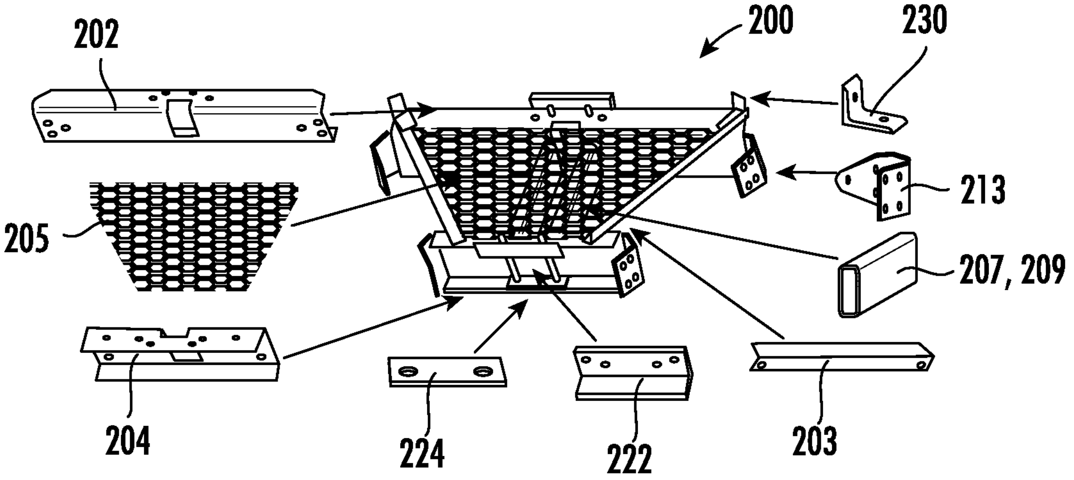

Referring to FIGS. 5A-5G, an adjustable T-arm assembly 200 according to embodiments of the present invention is illustrated (see also, e.g., FIG. 8B). Each T-arm assembly 200 may include a platform frame 201 and an adjustable arm member 208. In some embodiments, the adjustable arm member 208 is tubular with a rectangular cross-section; in some instances, a rectangular arm member has an aspect ratio of height:width of greater than 1 (i.e., the arm member 208 is taller than it is wide). A mounting plate 206 may be coupled to one end of the adjustable arm member 208.

The platform frame 201 may include a pair of support members 202, 204 and a plurality of brace members 207, 209 coupled to and extending between each support member 202, 204. Mounting brackets 213 are coupled to opposing ends of each support member 202, 204. In some embodiments, the mounting brackets 213 are configured to secure the platform frame 201 to horizontal pipes or members 12 of the platform assembly 100 (see, e.g., FIG. 4).

Each support member 202, 204 comprises a respective aperture 202*a*, 204*a*. As shown in FIGS. 5B-5C, the apertures 202*a*, 204*a* in the support members 202, 204 are aligned and two of the brace members 209 reside on opposing sides of the respective apertures 202*a*, 204*a* to form a channel 210 extending between and through the support members 202, 204. In some embodiments, two of the brace members 209 may reside immediately adjacent to the adjustable arm member 208. The other brace members 207 extend between the support members 202, 204 and provide additional structural support to the platform frame 201 (i.e., grating 205). As discussed in further detail below, in some embodiments, the adjustable arm member 208 is configured to be slidable within the channel 210 (and through apertures 202*a*, 204*a*), thereby allowing the T-arm assembly 200 to be adjustable, for example, to accommodate the different diameters along the monopole that may be encountered by the assembly 200 (see, e.g., FIG. 5A and FIG. 5D). The brace members 209 provide support to the adjustable arm member 208 while also helping to prevent the adjustable arm member 208 from twisting within the channel 210.

The platform frame 201 of the T-arm assembly 200 may further comprise at least two grating edge members 203. The grating edge members 203 are coupled to the support members 202, 204. In addition, each platform frame 201 further comprises a grating 205 coupled to the grating edge members 203. The grating 205 may be supported by the grating edge members 203, the support members 202, 204, the brace members 207, 209, and the main support member 208, thereby providing a work platform on which a technician can stand. In some embodiments, the components of the T-arm assembly 200 that define the platform frame 201 are formed of a weldment, except for the adjustable arm member 208 which is allowed to slide within the channel 210. In some embodiments, the T-arm assembly 200 may comprise galvanized steel.

Figure 5A:
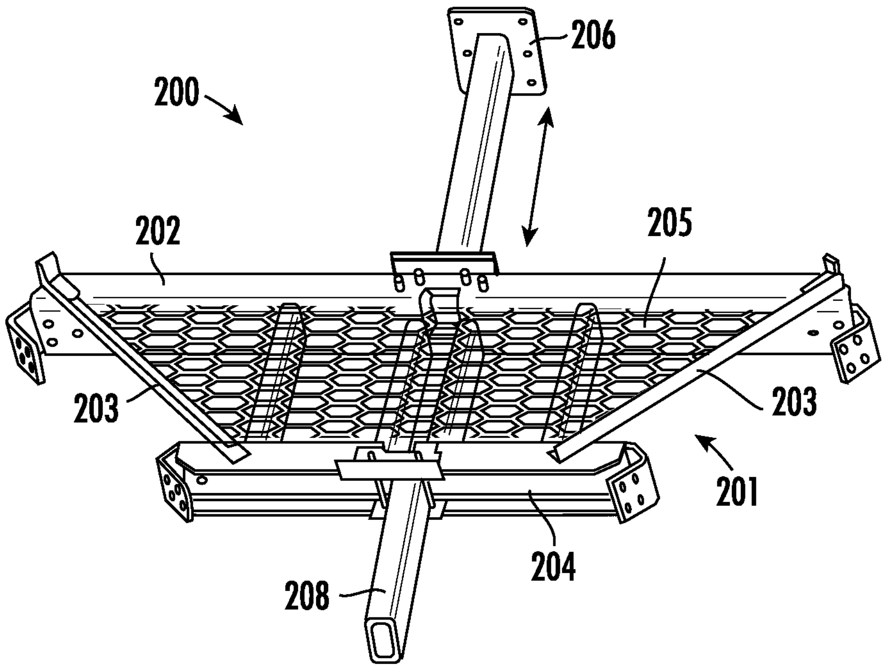
FIG. 5A is a top perspective view of an adjustable T-arm assembly according to embodiments of the present invention that may be utilized in the monopole platform assembly of FIG. 4.
Figure 5B:
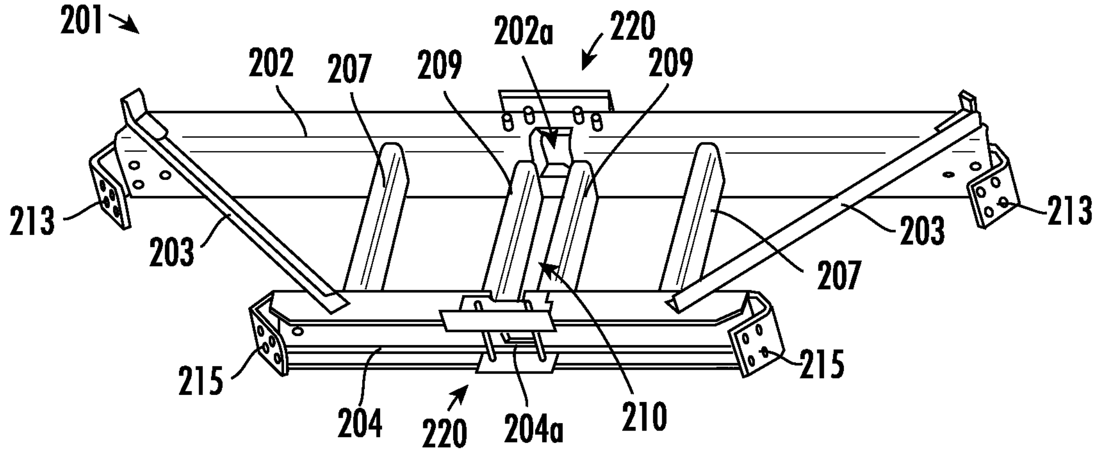
FIG. 5B is a top perspective view of the T-arm assembly of FIG. 5A with the grating and adjustable arm member removed.
Figure 5C:
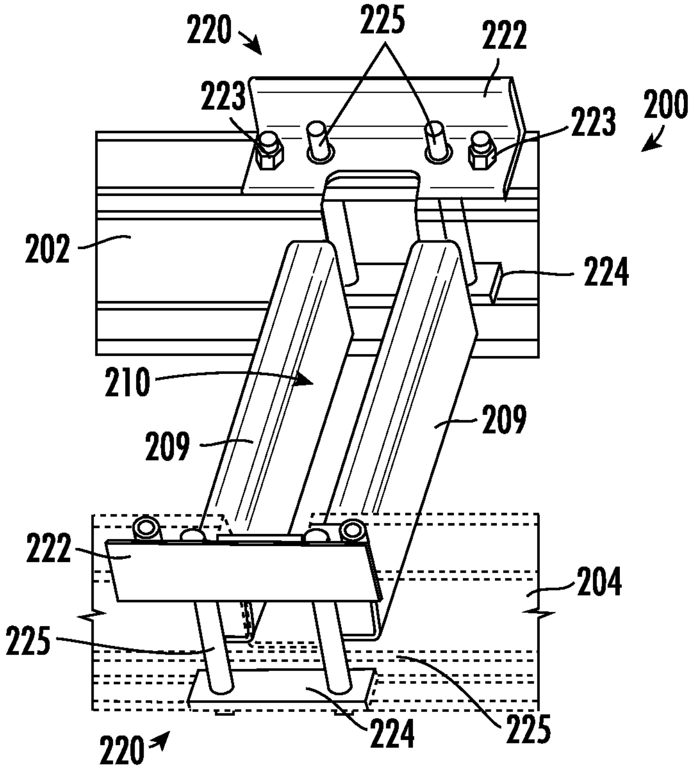
FIG. 5C is an enlarged top perspective view of a channel of the T-arm assembly of FIG. 5B.
Figure 5D:
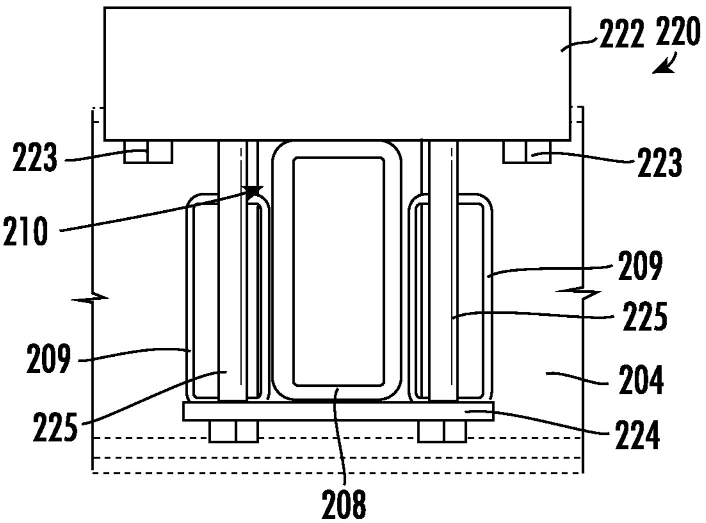
FIG. 5D is a front view of the channel of the T-arm assembly of FIG. 5C.
Figure 5E:
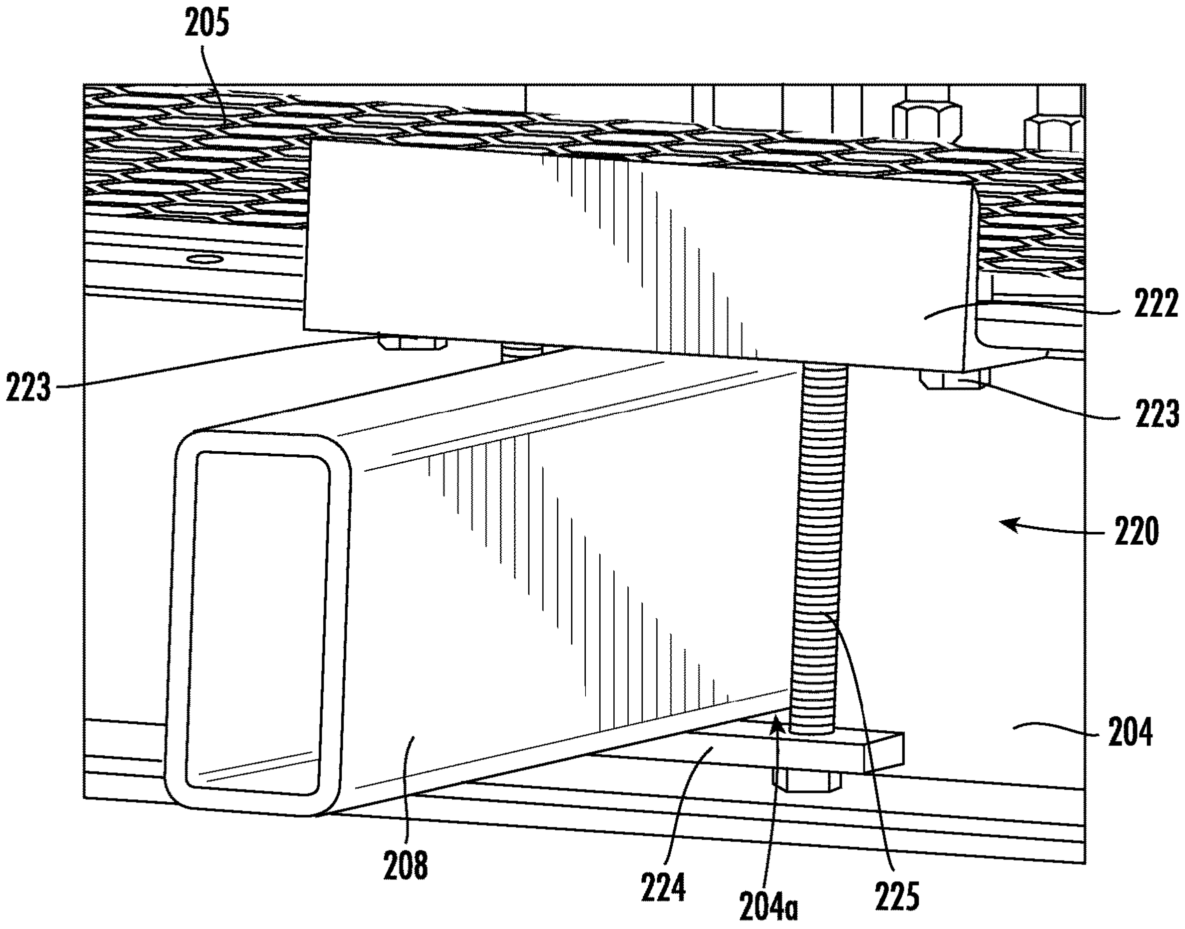
FIG. 5E is an enlarged front perspective view of the locking bracket and adjustable arm member of the T-arm assembly of FIG. 5A.

As shown in FIGS. 5C-5E, in some embodiments, the T-arm assembly 200 may further include a pair of locking brackets 220, each bracket 220 coupled to a respective support member 202, 204 and residing adjacent to a respective aperture 202*a*, 204*a*. Each bracket 220 may comprise an upper bracket member 222 and a lower bracket member 224. Each upper bracket member 222 may be secured to the respective support member 202, 204 via a first pair of securing features 223 (e.g., nuts and bolts or the like). Each upper bracket member 222 is coupled to the corresponding lower bracket member 224 via a second pair of securing features 225 (e.g., bolts, threaded rods or the like). The second pairs of securing features 225 are spaced apart such that the securing features 225 reside on opposing sides of the respective apertures 202*a*, 204*a* (i.e., in alignment with brace members 209) (see, e.g., FIG. 5C).

Figure 5F:
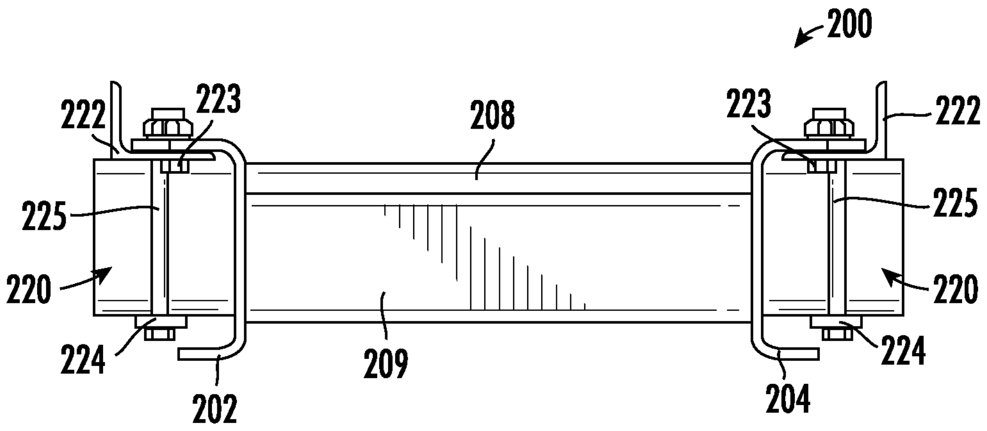
FIG. 5F is a side view of the T-arm assembly of FIG. 5A.

As shown in FIG. 5A, FIG. 5D, and FIG. 5E, the adjustable arm member 208 extends through the respective apertures 202*a*, 204*a* and between the upper and lower bracket members 222, 224 of the brackets 220. The adjustable arm member 208 is slidable (i.e., adjustable) within the channel 210 to accommodate different diameters along the height of the monopole 10. As shown in FIGS. 5E-5F, once the adjustable arm member 208 is moved (slid) within the channel 210 to a desired position (i.e., the adjustable arm member 208 and mounting plate 206 are positioned against the monopole 10), the second securing features 225 are tightened to clamp the adjustable arm member 208 between corresponding upper and lower bracket members 222, 224 of the brackets 220, thereby securing the adjustable arm member 208 in the desired position within the channel 210. As shown in FIG. 5C, in some embodiments, the upper bracket members 222 of the brackets 220 may have an L-shaped profile which helps to ensure strength around the apertures 202*a*, 204*a* in the support members 202, 204, and thus, provide further structural support to the T-arm assembly 200.

Figure 5G:
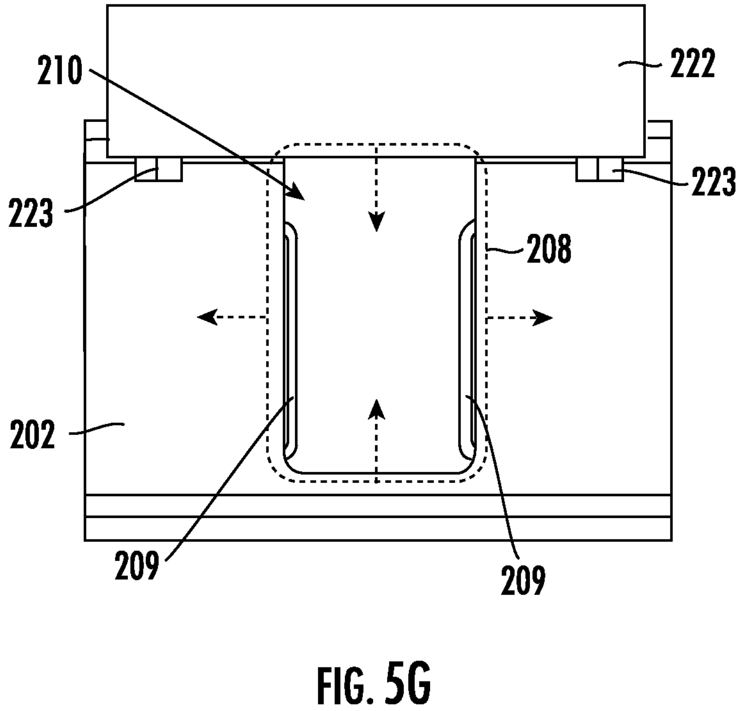
FIG. 5G is an enlarged front view of the channel of the T-arm assembly of FIG. 5C illustrating that the dimensions of the channel can be adjusted to accommodate different sized adjustable arm members.

As shown in FIG. 5G, in some embodiments, the T-arm assembly 200 may be adjusted to accommodate changes in the shape of the adjustable arm member 208. For example, during manufacture of the platform frame 201, the brace members 209 may be positioned to accommodate adjustable arm members 208 having different widths. In addition, as shown above, the upper and lower bracket members 222, 224 of the brackets 220 are configured such that adjustable arm members 208 having different heights may be clamped therebetween.

Figure 2:
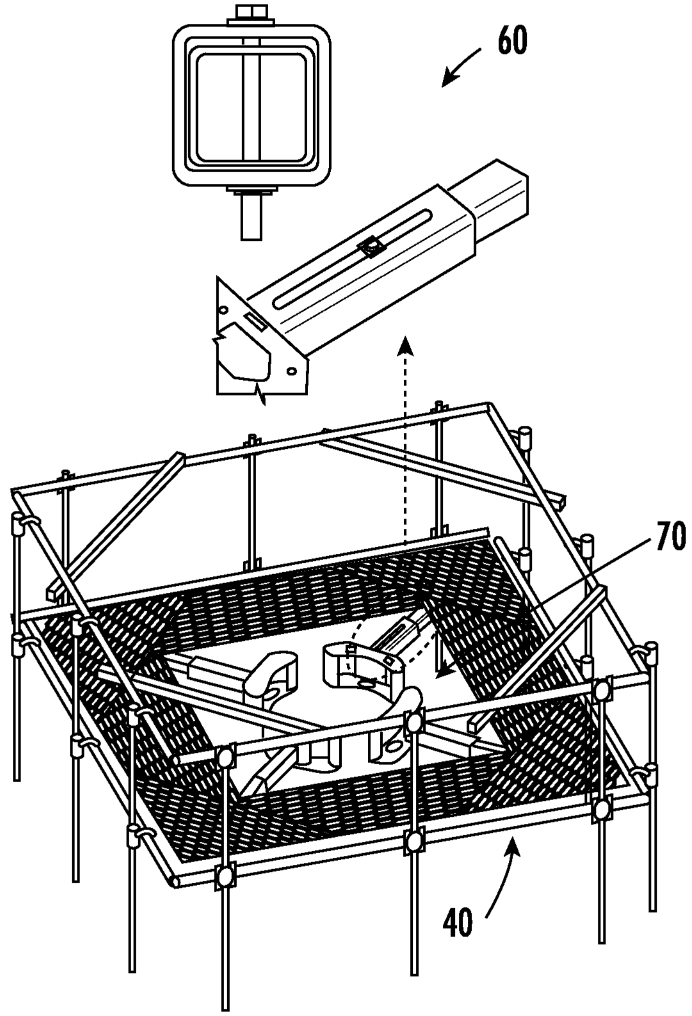
FIG. 2 PRIOR ART
FIG. 2 and FIG. 3 are perspective views of known monopole platform assemblies and enlarged views of the retractable T-arms utilized respectively therewith.
Figure 3:
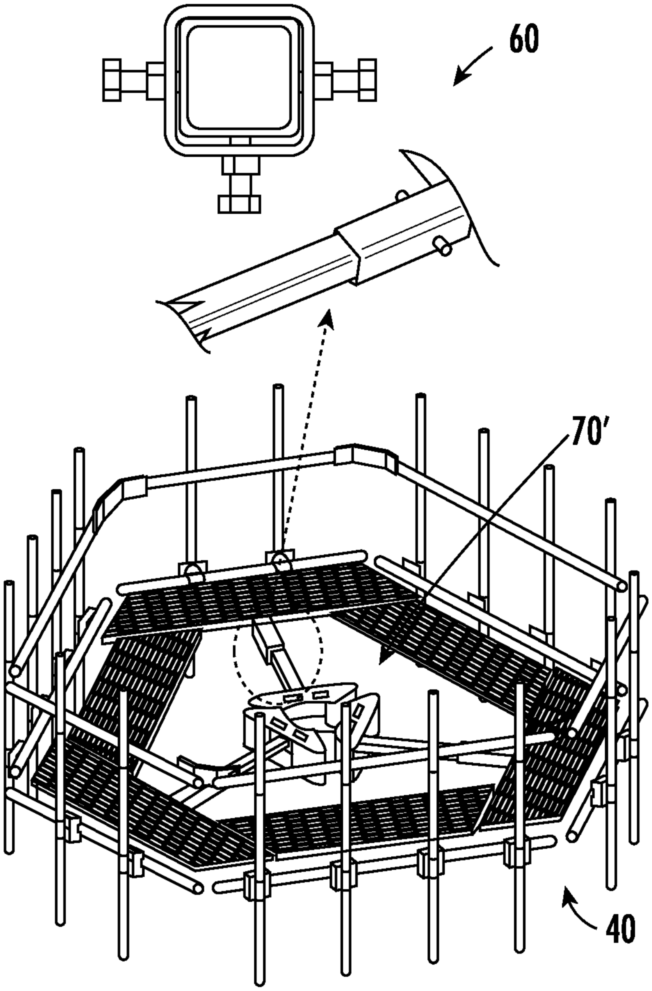
FIG. 3 PRIOR ART
Figure 6A:
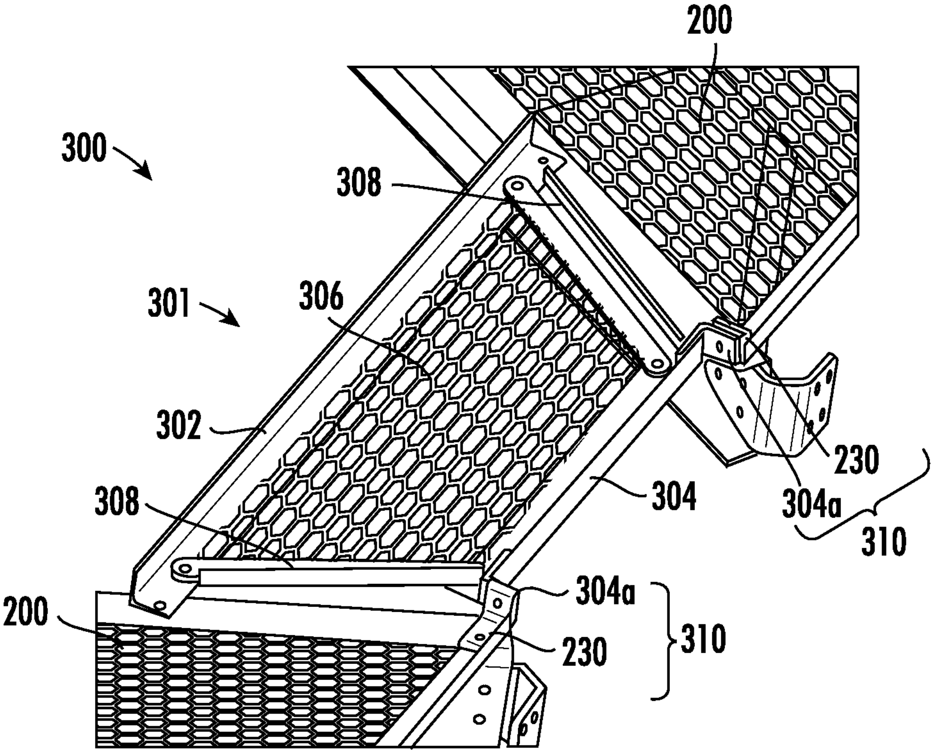
FIGS. 6A-6B are top and top perspective views illustrating a grating section according to embodiments of the present invention that may be utilized in the monopole platform assembly of FIG. 4.
Figure 6B:
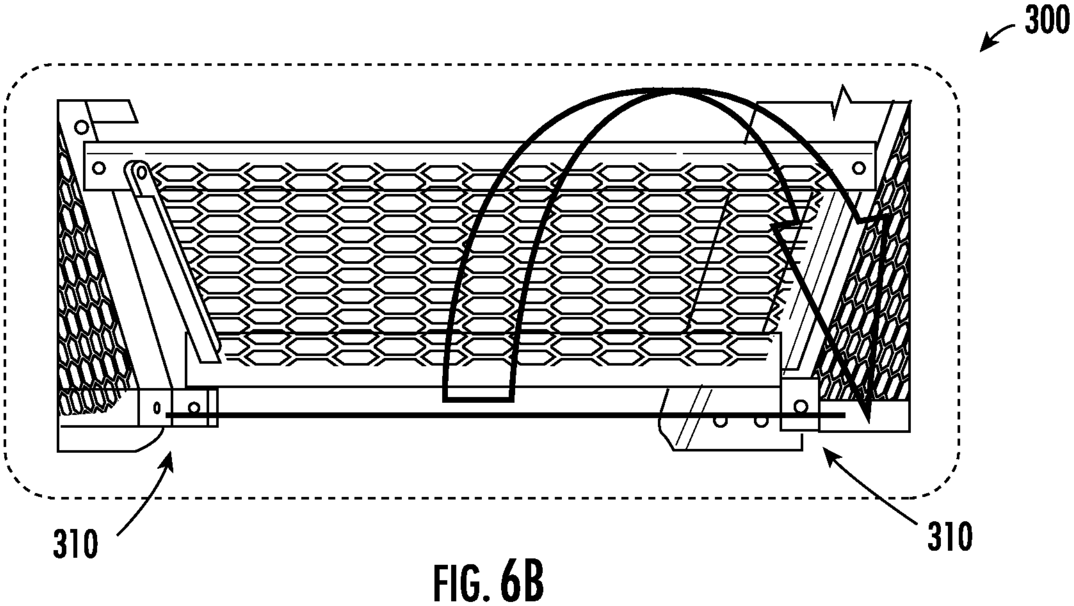

Referring now to FIGS. 6A-6B, a grating section (or walkway module) 300 according to embodiments of the present invention is illustrated (see also, e.g., FIG. 8A). One or more of the grating sections 300 may be utilized in the platform assembly 100 of the present invention described herein. As shown in FIGS. 4 and 6A, each grating section 300 may reside between T-arm assemblies 200 (see also, e.g., FIG. 2). The grating section(s) 300 may provide easy access to walkways between T-arm assemblies 200 for technicians and/or equipment. In some embodiments, the grating section 300 may include a frame 301. The frame 301 may comprise a pair of support members 302, 304. In some embodiments, the frame 301 of the grating section 300 may further comprise at least two grating edge members 308. The grating edge members 208 are coupled to the support members 302, 304. In addition, the frame 201 further comprises a grating 306 coupled to the grating edge members 308. The grating 306 may be supported by the grating edge members 308 and the support members 302, 304, thereby providing a walkway on which a technician can stand. Similar to the T-arm assembly 200, in some embodiments, the components of the grating section 300 that define the frame 301 are formed of a weldment. In some embodiments, the grating section 300 may comprise galvanized steel.

As noted above, and shown in FIG. 6A, each grating section 300 may reside between two T-arm assemblies 200. In some embodiments, a pair of hinging brackets 230 may be used to secure the grating section 300 to the respective T-arm assemblies 200. As shown in FIG. 6B, in some embodiments, the grating sections 300 are configured such that the frame 301 can be pivoted (i.e., swung) upwardly (as illustrated by the arrow in FIG. 6B) to create additional space between the mounting structure (e.g., monopole 10) and the platform assembly 100, for example, to lift equipment to the platform assembly 100 or to access locations just below or beneath the grating section 300. For example, in some embodiments, securing mechanisms (e.g., bolts) may be inserted through respective apertures 304*a* in support member 304 to secure the grating section 300 to the brackets 230, thereby creating a hinge 310 which allows the grating section 300 to pivot in relation to the T-arm assemblies 200.

Figure 7A:
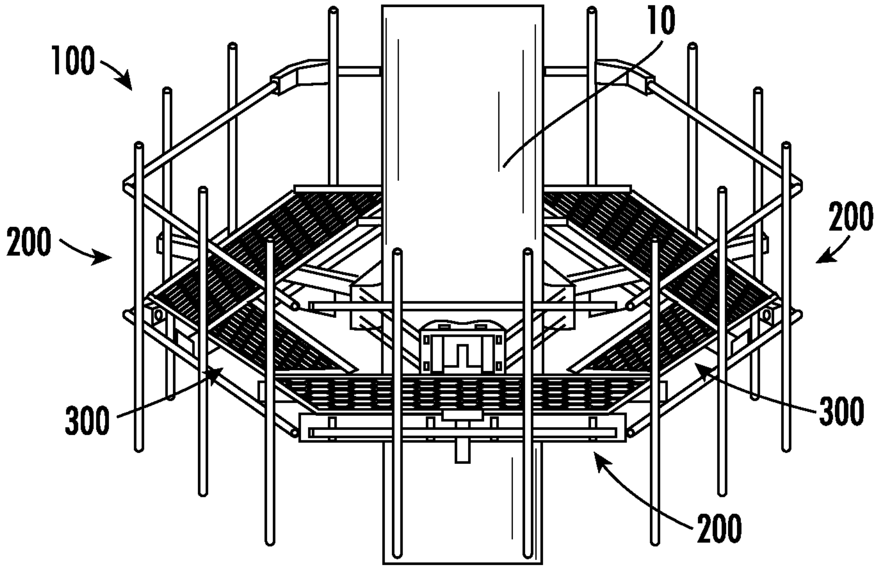
FIGS. 7A-7C are top perspective views illustrating the adjustable T-arm assembly and grating section shown in FIGS. 5A-5F and FIGS. 6A-6B, respectively, being utilized with a hex-platform (FIG. 7A), a quad-platform (FIG. 7B) or a tri-platform (FIG. 7C).
Figure 7B:
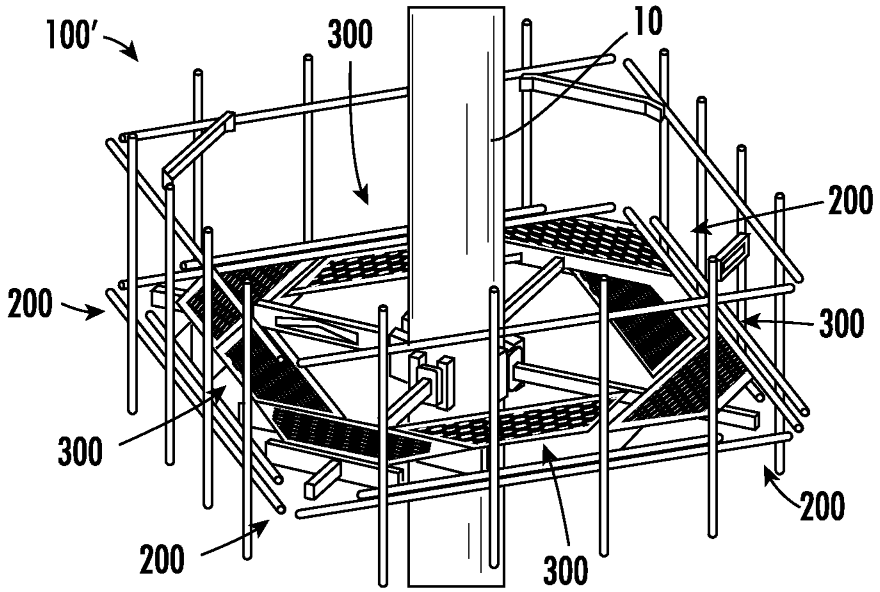
Figure 7C:
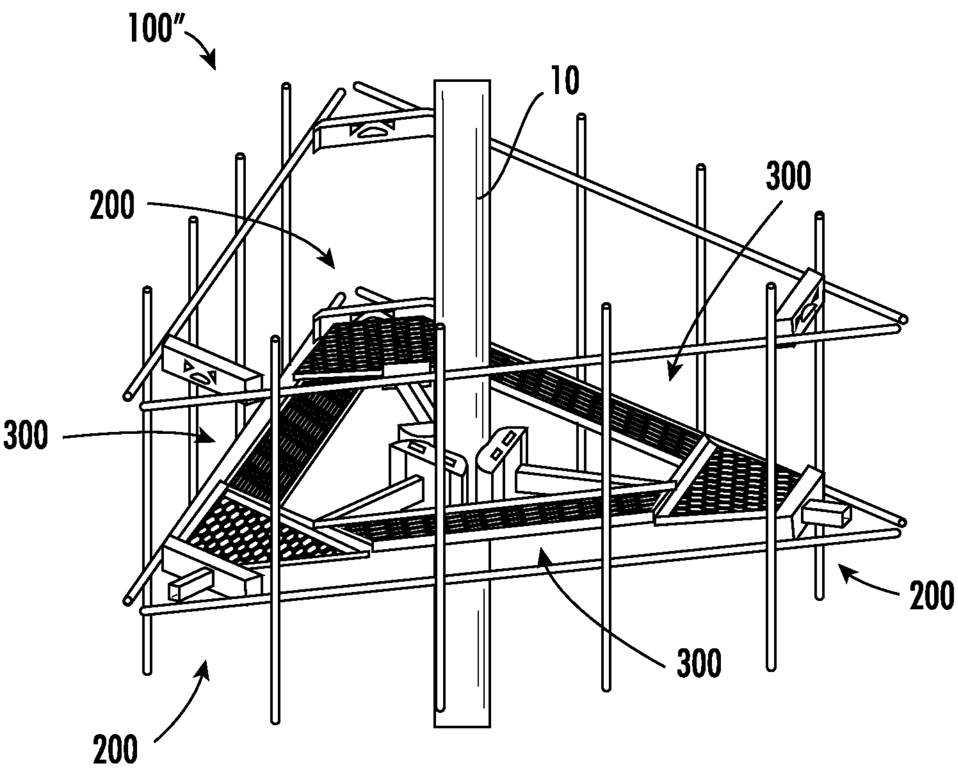

Referring to FIGS. 7A-7C, the platform assembly 100 of the present invention has the flexibility to be utilized in a variety of different fortress-type platform configurations. For example, FIG. 7A illustrates the platform assembly 100 of the present invention being utilized with a hex-platform. FIG. 7B illustrates a platform assembly 100' according to embodiments of the present invention being utilized with a quad-platform (which is generally square). FIG. 7C illustrates the platform assembly 100" according to embodiments of the present invention being utilized with a tri-platform (which is generally triangular). The design of the platform assemblies 100, 100', 100" of the present invention has the ability to effectively reduce wind resistance while also increase structure strength and load capacity.

Figure 8C:
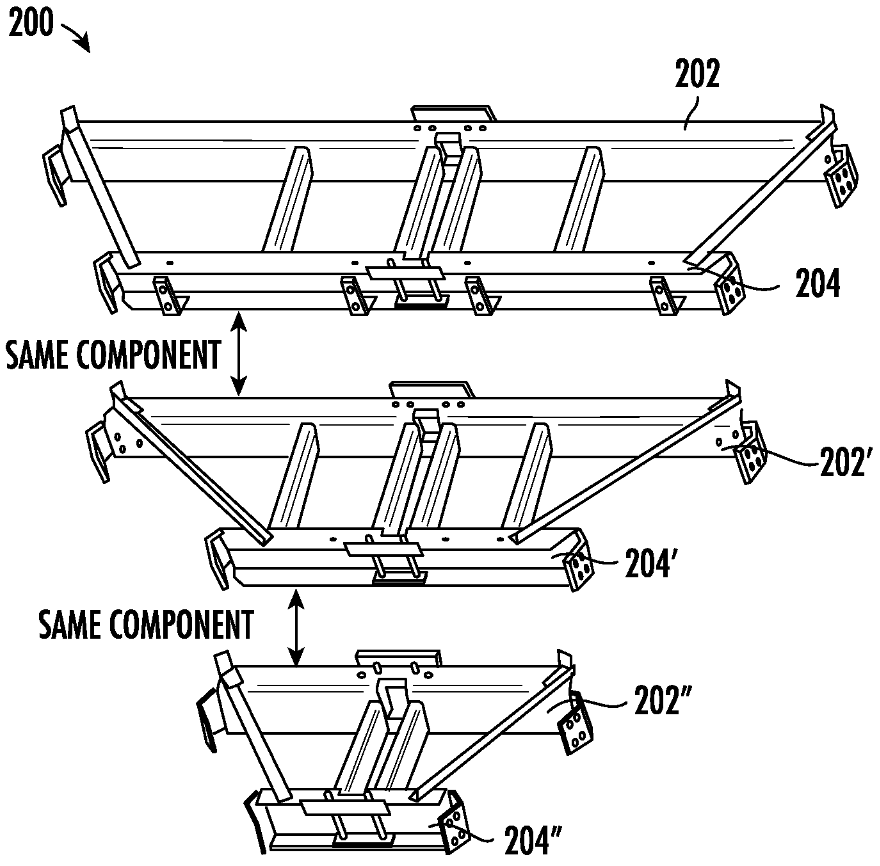

Referring to FIGS. 8A-8C, according to embodiments of the present invention, the platform assembly 100 may also have a modular design which allows the platform assembly to be extended to the different types of platforms shown in FIGS. 7A-7C (e.g., tri-platform, quad-platform, and hex-platform). The modular design of the present invention (i.e., the T-arm assembly 200 and the grating section 300) allows for a high material utilization rate, thereby significantly reducing the number of parts and reducing production costs. In addition, the design can be flexibly changed according to the section change of the T-arm assembly 200, not limited by profile steel size and market supply. For example, as shown in FIG. 8C, the same component (e.g., support members 202, 204, 202', 204', 202", 204") may be used in different T-arm assemblies 200 having varying sizes, as can the braces 207, 209.

Figure 9A:
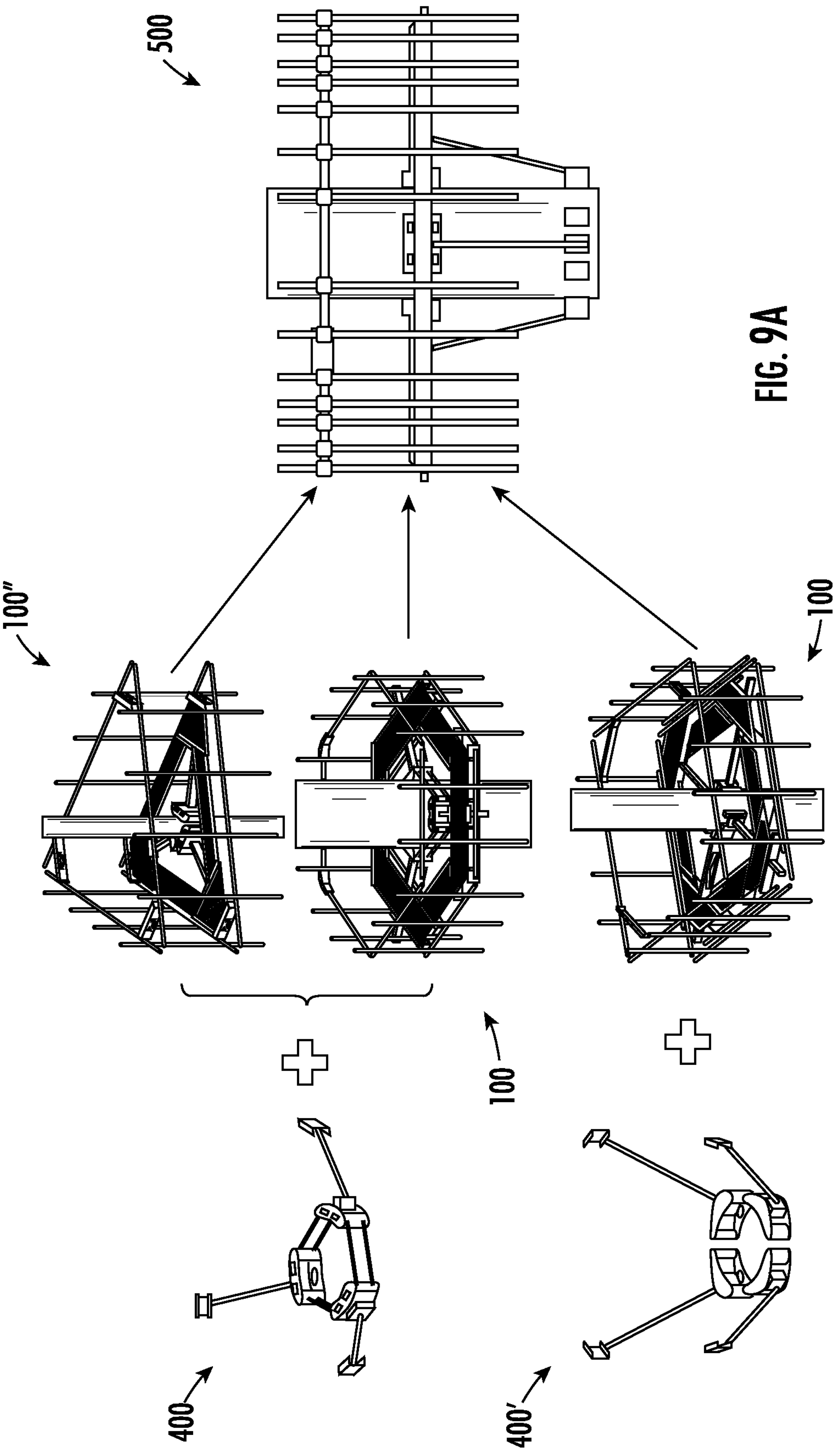
FIGS. 9A-9B illustrate the monopole platform assembly of FIG. 4 being utilized with existing reinforcement kits according to embodiments of the present invention.
Figure 9B:
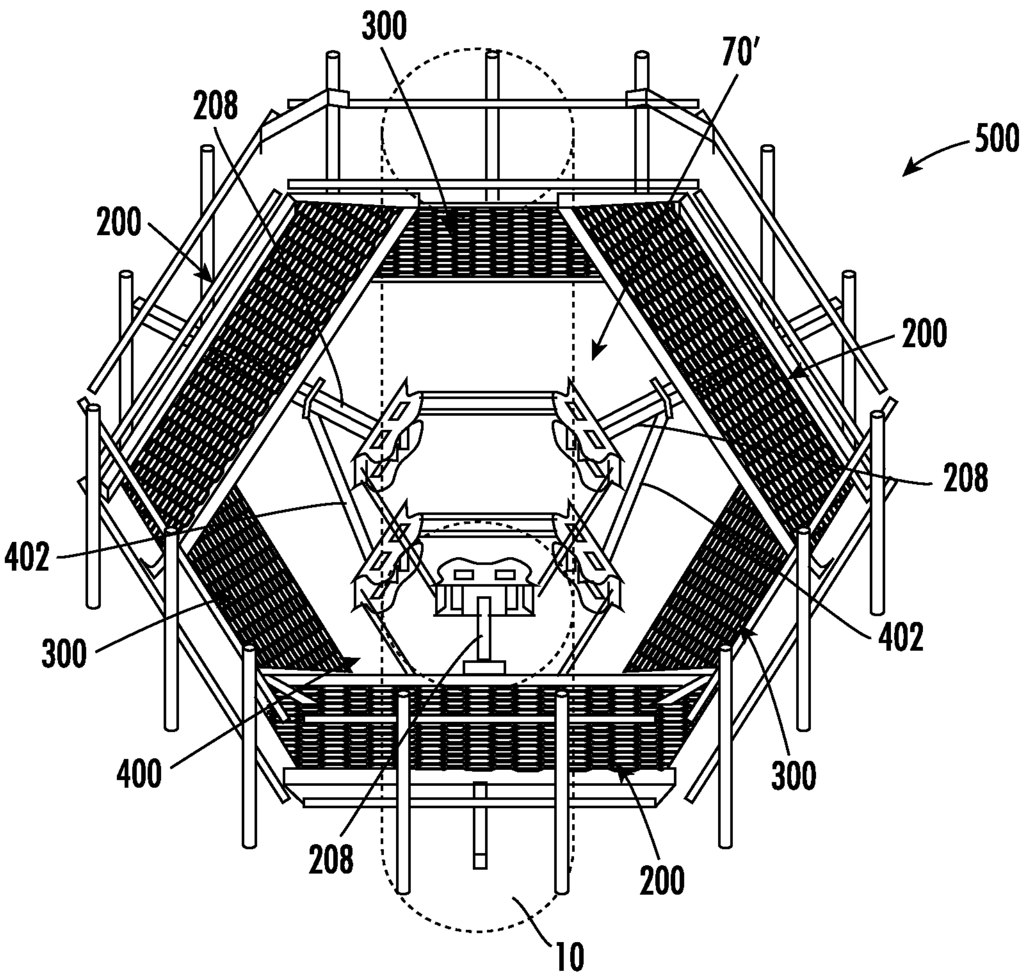

Referring to FIGS. 9A-9B, the platform assembly 100 of the present invention is compatible with existing reinforcement kits 400, 400' to form a platform assembly 500 having an increased carrying capacity. Such reinforcement kits 400, 400' typically include a locking ring 404 that mounts to the monopole 10 below the platform assembly 100 and reinforcement pipes 402. As shown in FIG. 9B, in some embodiments, the reinforcement pipes 402 of the reinforcement kit 400 are configured to be secured to the respective adjustment arms of the T-arm assemblies 200.

Figure 10A:
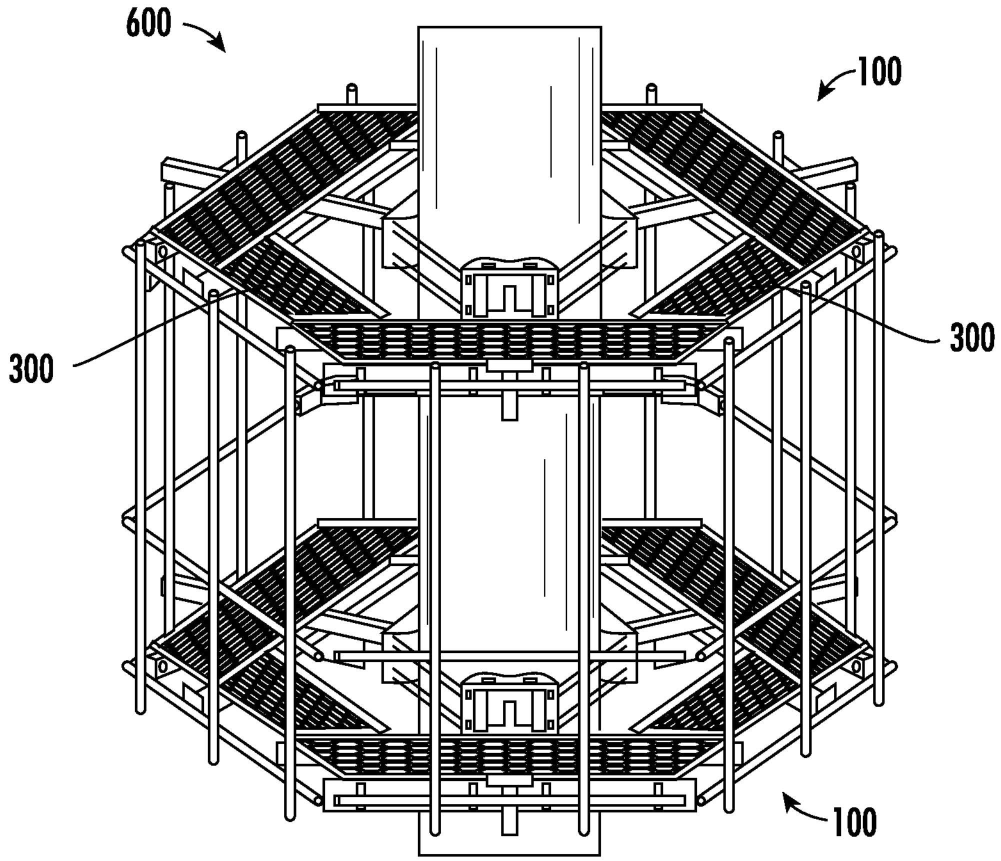
FIGS. 10A-10C illustrate the monopole platform assembly of FIG. 4 being utilized in double-layer cage applications according to embodiments of the present invention.
Figure 10B:
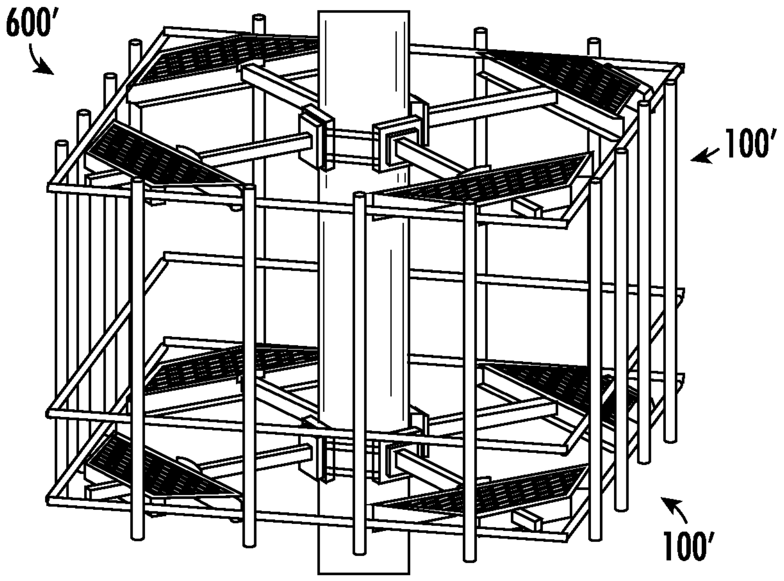
Figure 10C:
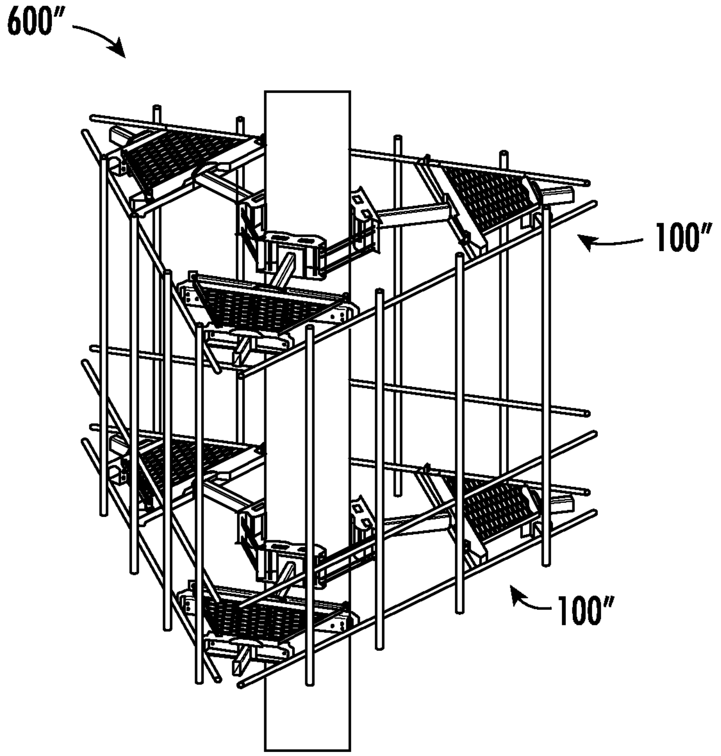

Referring to FIGS. 10A-10C, in some embodiments, the platform assemblies 100, 100', 100" of the present invention may be utilized in a double-layer cage assembly 600, 600', 600". As shown in FIGS. 10A-10C, the platform assemblies 100, 100', 100" incorporated into the double-layer cage assemblies 600, 600', 600" may or may not include the grating sections 300. For example, FIG. 10A illustrates the double-layer cage assembly 600 with the grating sections 300 and FIGS. 10B-10C illustrate the double-layer cage assemblies 600', 600" without the grating sections.

Referring now to FIGS. 11A-14, another grating section (or walkway module) 700 according to embodiments of the present invention is illustrated. Many existing grating sections currently available in the market do not lie flush with respect to adjacent platform assemblies 100, 100', 100" which can be a safety concern (e.g., a tripping hazard). In addition, some grating sections may not include a "hard stop" when the section is moved (e.g., pivoted) to an open position (see, e.g., FIGS. 6A-6B), which requires a technician to support the grating section with their hands or other tools. The grating section 700 of the present invention provides easy access for technicians and equipment to move between adjacent platform assemblies 100 and can be easily fixed in an open position.

Similar to the other grating sections 300 described herein, one or more of the grating sections 700 may be utilized in the platform assemblies 100, 100', 100" of the present invention described herein. Similarly, each grating section 700 may reside between T-arm assemblies 200.

In some embodiments, the grating section 700 may include a frame 701. The frame 701 may comprise a pair of support members 702, 704. In some embodiments, the frame 701 of the grating section 700 may further comprise at least two grating edge members 708. The grating edge members 708 are coupled to the support members 702, 704. In addition, the frame 701 further comprises a grating 706 coupled to the grating edge members 708. The grating 706 may be supported by the grating edge members 708 and the support members 702, 704, thereby providing a walkway on which a technician can stand. In some embodiments, the components of the grating section 700 that define the frame 701 are formed as a weldment. In some embodiments, the grating section 700 may comprise galvanized steel.

As noted above, and shown in FIGS. 12A and FIG. 12C, each grating section 700 may reside between two T-arm assemblies 200 to form a platform assembly 800. In some embodiments, a bracket assembly 710 may be used to secure the grating section 700 to the respective T-arm assemblies 200 (see also, e.g., FIGS. 13A-13B). As shown in FIGS. 12A-12D, in some embodiments, the grating sections 700 are configured such that the frame 701 can be pivoted (i.e., swung) upwardly to create additional space between the mounting structure (e.g., monopole 10) and the platform assembly 800, for example, to lift equipment to the platform assembly 800 or to access locations just below or beneath the grating section 700.

Figure 12A:
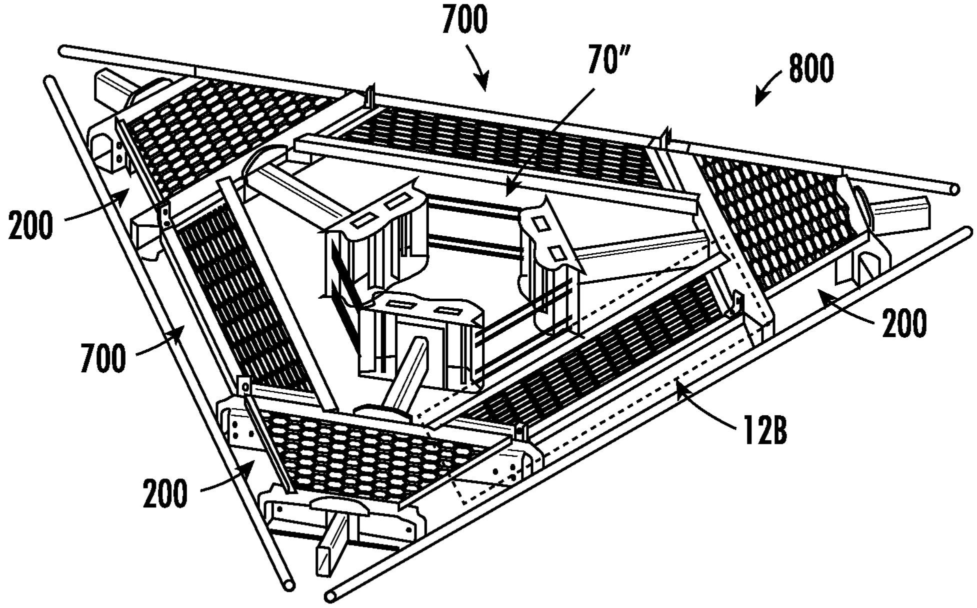
FIG. 12A is a top perspective view of a platform assembly according to embodiments of the present invention with the grating section in a "closed" position.
Figure 12B:
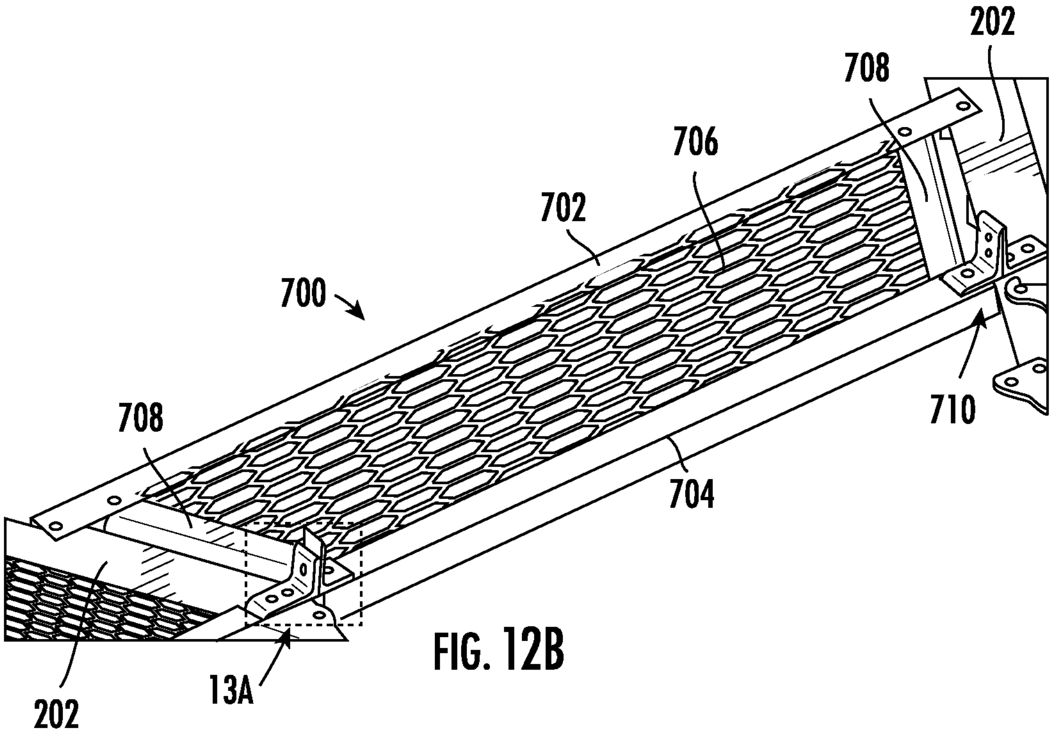
FIG. 12B is an enlarged top perspective view of the grating section in the closed position as shown in FIG. 12A.

FIGS. 12A-12B illustrate the grating sections 700 in a "closed" position which creates a walkway for a technician to move around the platform assembly 800. As shown in FIG. 12B, when the grating sections 700 are in the closed position, a top edge of each grating edge member 708 is flush (i.e., top surface extends along the same plane) with the support members 202 of the adjacent T-arm assemblies 200, thereby creating a safer passage for a technician to move between grating section 700 and T-arm assemblies 200 (i.e., no tripping hazard).

Figure 12C:
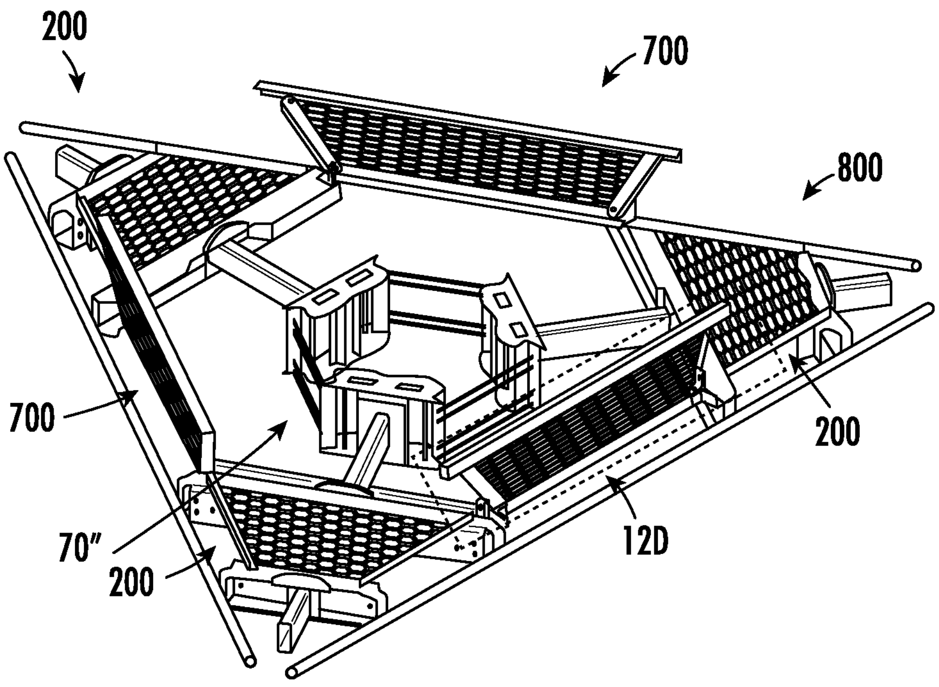
FIG. 12C is a top perspective view of the platform assembly according to embodiments of the present invention with the grating section in an "open" position.
Figure 12D:
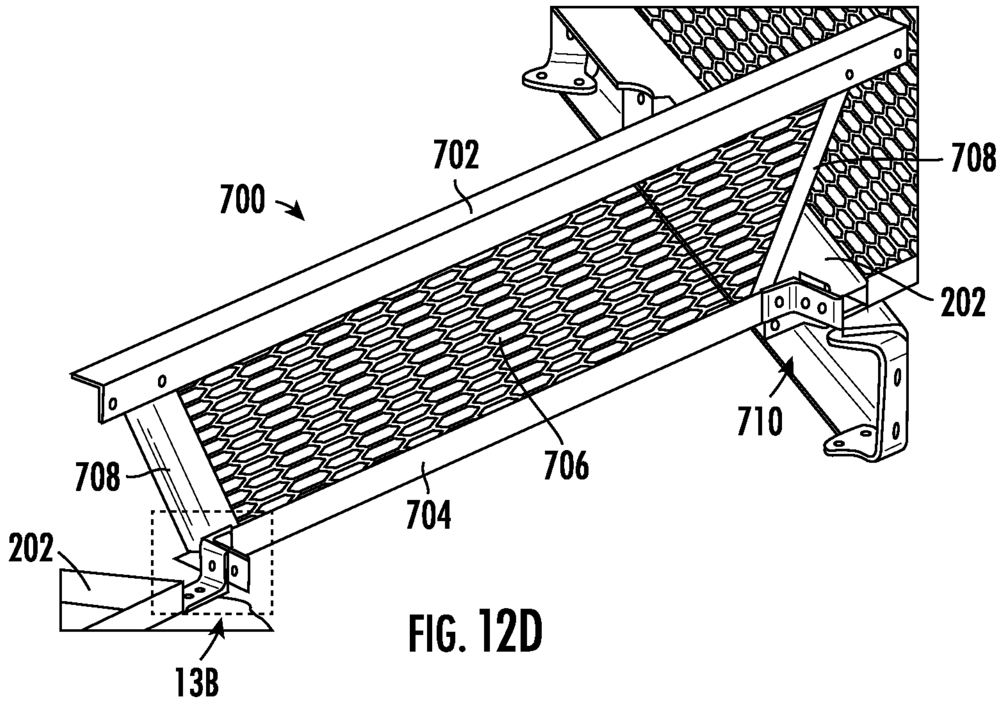
FIG. 12D is an enlarged top perspective view of the grating section in the open position as shown in FIG. 12C.

FIGS. 12C-12D illustrate the grating sections 700 in an "open" position (i.e., pivoted or swung upwardly about 90 degrees relative to the adjacent T-arm assemblies 200). As discussed above, when the grating sections 700 are in the open position, additional space is created between the mounting structure (e.g., monopole 10) and the platform assembly 800, for example, to lift equipment to the platform assembly 800 or to access locations just below or beneath the grating section 700. As discussed in further detail below, the bracket assembly 710 allows the grating section 700 to be fixed in the open position, thereby eliminating the need for a technician to hold the grating section 700 in the open position and/or use tools to hold the grating section 700 in the open position.

Figure 13A:
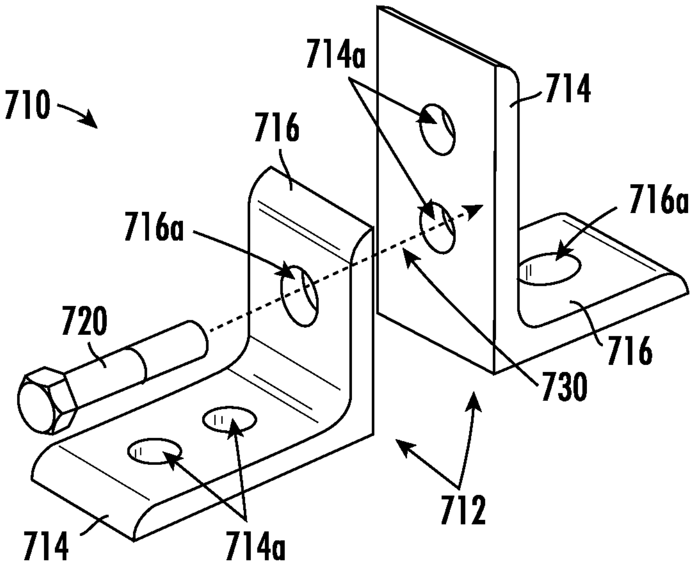
FIG. 13A illustrates the positions of corresponding brackets of the grating section when the grating section is in the closed position.
Figure 13B:
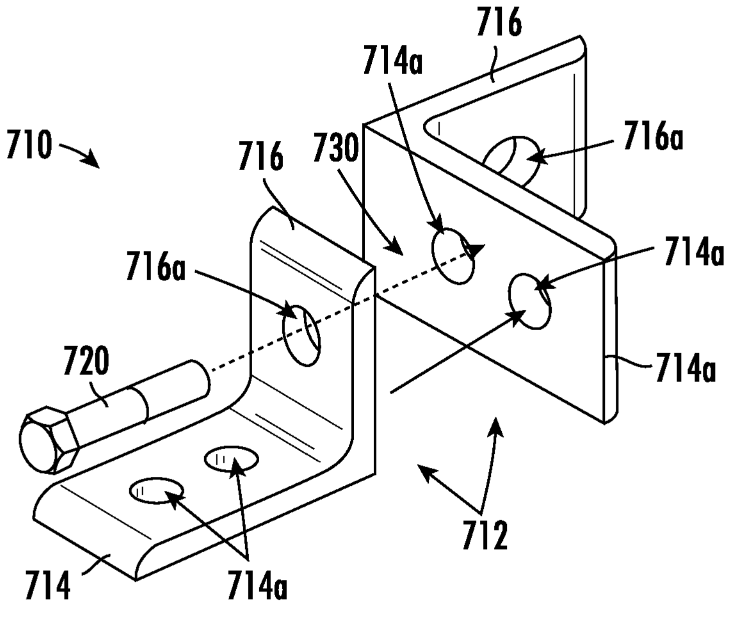
FIG. 13B illustrates the positions of corresponding brackets of the grating section when the grating section is in the open position.

Referring now to FIGS. 13A-13B, the bracket assembly 710 is illustrated. FIG. 13A shows the orientation of the bracket assembly 710 when the grating section 700 is in the closed position. FIG. 13B shows the orientation of the bracket assembly 710 when the grating section 700 is in the open position. As shown in FIGS. 13A-13B, the bracket assembly 710 includes an identical pair of main bracket members 712. Each main bracket member 712 has an L-shaped profile with a first longer segment 714 and a second shorter segment 716. The first longer segment 714 comprises two apertures 714*a* and the second short segment 716 comprises one aperture 716*a*. Each of the apertures 714*a*, 716*a* are sized and configured to receive a fastener 720 (e.g., a bolt).

Figure 11A:
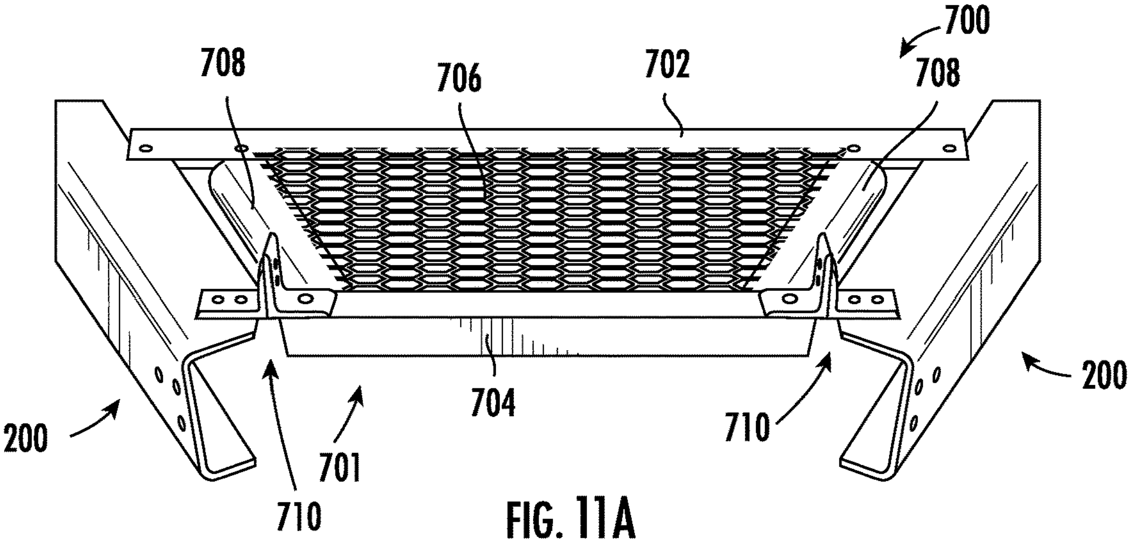
FIG. 11A is a top perspective view of another grating section according to embodiments of the present invention.
Figure 11B:
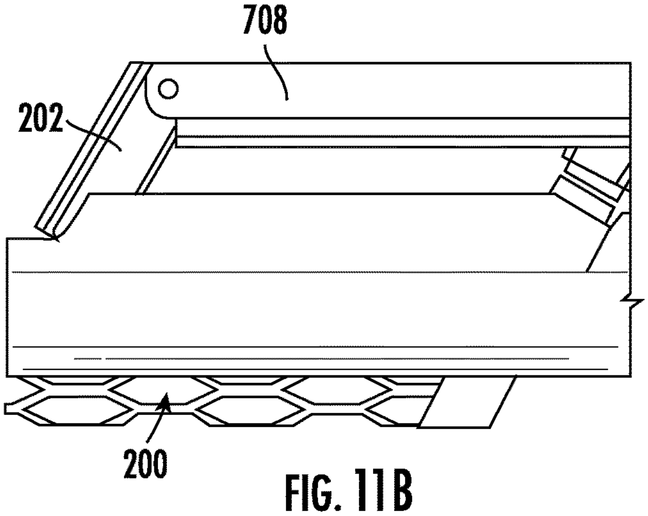
FIG. 11B is an enlarged bottom view highlighting a support feature of the grating section of FIG. 11A.
Figure 11C:
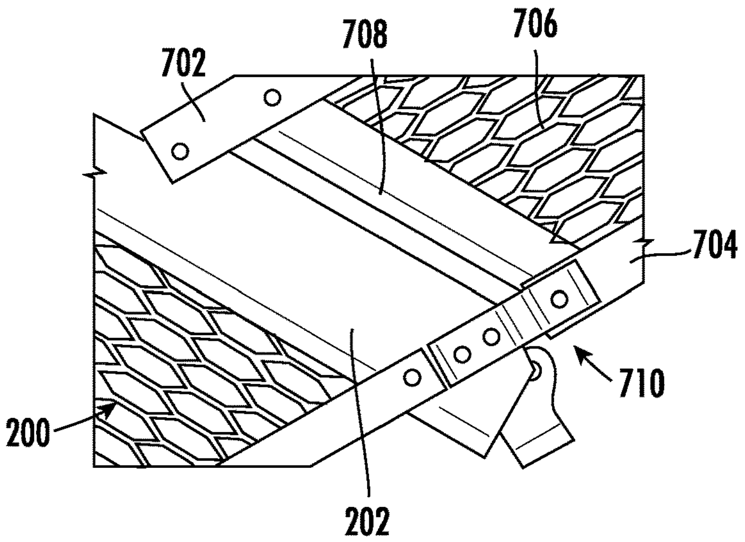
FIG. 11C is an enlarged top view highlighting the support feature of the grating section of FIG. 11A.

One main bracket member 712 from each bracket assembly 710 is secured to the grating section 700 and the other main bracket member 712 is secured to the adjacent T-arm assembly 200. As shown in FIG. 11A and FIG. 11C, the longer segment 714 of one of the main bracket members 712 is secured to a respective support member 202 for the T-arm assembly 200 via fasteners (e.g., bolt) inserted through apertures 714*a*. The other main bracket member 712 from the pair is rotated such that the shorter segment 716 is secured to the grating section 700 via a fastener (e.g., bolt) inserted through aperture 716*a*. Therefore, when the grating section 700 is in a closed position, the shorter segment 716 of one main bracket member 712 (i.e., the main bracket member 712 secured to the T-arm assembly 200) is aligned with the longer segment 714 of the other main bracket member 712 (i.e., the main bracket member secured to the grating section 700) (see, e.g., FIG. 13A). A fastener 720 (e.g., bolt) is received through the aperture 716*a* in the shorter segment 716 and the bottom aperture 714*a* in the longer segment 714 (as shown in FIG. 13A) which creates a hinge rotation axis 730 which allows the grating section 700 to pivot between closed and open positions, while at the same time securing the grating section 700 to the adjacent T-arm assemblies 200.

As shown in FIG. 13A, the longer segment 714 of one main bracket member 712 and the shorter segment 716 of the other main bracket member 712 are positioned or oriented to extend upwardly relative to the grating section when the grating section 700 is in a closed position. It is noted that, in some embodiments, the orientation of the bracket members 712 may be rotated such that the respective longer and shorter segments 714, 716 are positioned or oriented to extend downwardly relative to the grating section 700 when the grating section 700 is in a closed position (see, e.g., FIGS. 18A-18B).

When the grating section 700 is pivoted to the open position, e.g., about 90 degrees relative to the adjacent T-arm assemblies 200 (see, e.g., FIGS. 12C-12D), the top aperture 714*a* in the longer segment 714 of the main bracket member 712 secured to the grating section 700 is exposed (see, e.g., FIG. 13B). At this time, a second fastener 720 (e.g., bolt) may be inserted into the top aperture 714*a* to lock the grating section 700 in the open position, thereby preventing the grating section 700 from falling down back into the closed position due to wind and/or gravity.

Figure 14:
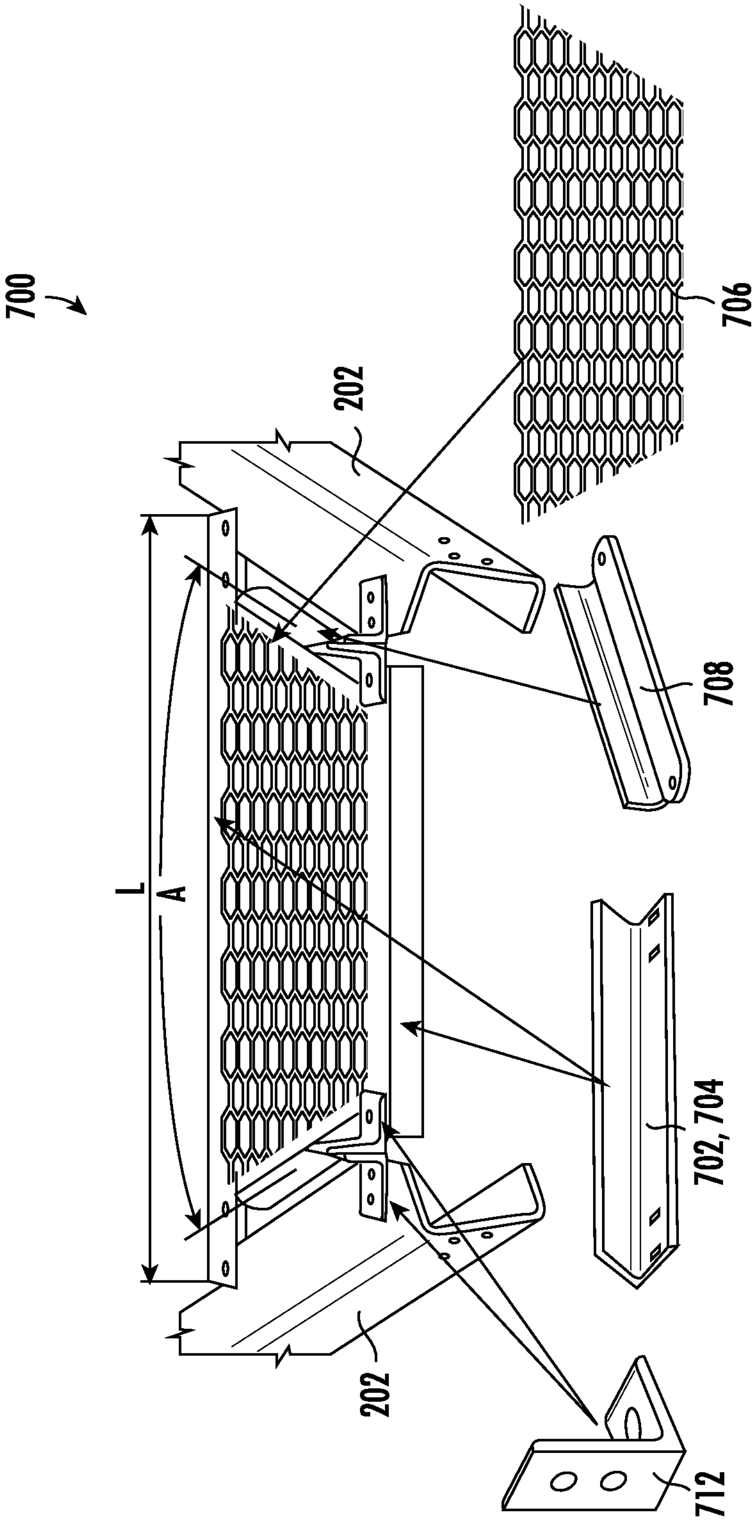
FIG. 14 illustrates the modular design of the grating section according to embodiments of the present invention.

Referring to FIG. 14, according to embodiments of the present invention, the grating section 700 may also have a modular design which allows the grating section 700 to be extended to the different types of platforms as described herein (e.g., tri-platform, quad-platform, and hex-platform). The modular design of the grating section 700 of the present invention allows for a high material utilization rate, thereby significantly reducing the number of parts and reducing production costs. The grating section 700 can be assembled or welded with simple and common parts. The same design can be adapted to different platforms by adjusting the length (L) of the support members 702, 704 and/or the angle (A) of the grating edge members 708.

Referring to FIGS. 15A-15F, another adjustable T-arm assembly 800 according to embodiments of the present invention is illustrated. Properties and/or features of the T-arm assembly 800 may be as described above in reference to the T-arm assembly 200 shown in FIGS. 5A-5G and duplicate discussion thereof may be omitted herein for the purposes of discussing FIGS. 15A-15F.

Figure 15A:
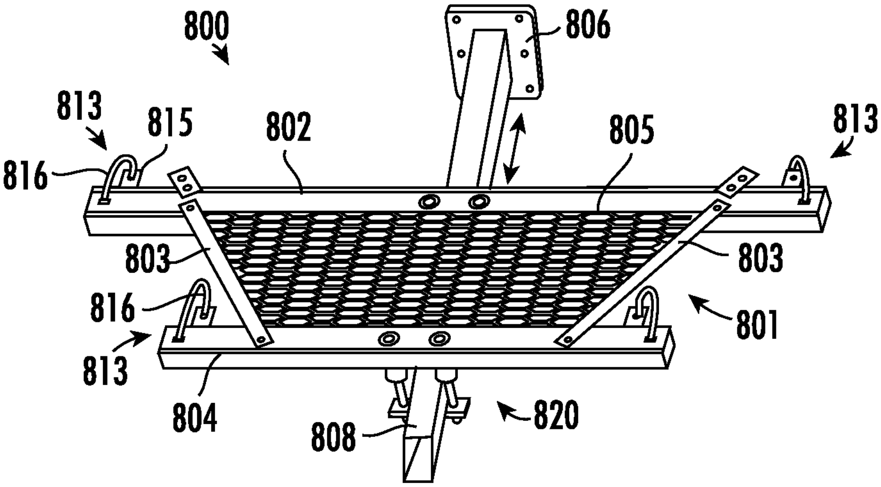
FIG. 15A is a top perspective view of a T-arm assembly according to embodiments of the present invention.
Figure 15B:
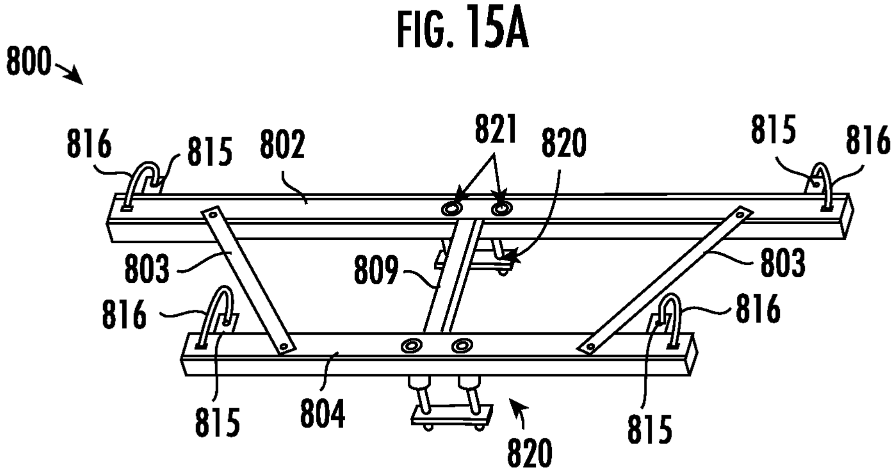
FIG. 15B is a top perspective view of the T-arm assembly of FIG. 15A with the grating and adjustable arm member removed.

As shown in FIG. 15A, the T-arm assembly 800 may include a platform frame 801 and an adjustable arm member 808. In some embodiments, the adjustable arm member 808 is tubular with a rectangular cross-section; in some instances, a rectangular arm member has a height:width aspect ratio of greater than 1 (i.e., the arm member 808 is taller than it is wide). A mounting plate 806 may be coupled to one end of the adjustable arm member 808.

The platform frame 801 may include a pair of support members 802, 804. A brace member 809 may be coupled to and extend between each support member 802, 804. The support members 802, 804 are tubular. In some embodiments, the support members 802, 804 may have a square or rectangular cross-section. The brace member 809 is configured to provide structural support to the platform frame 801 and adjustable arm member 808.

Each support member 802, 804 includes a plurality of apertures 802*a*, 804*a*, 821. Some of the apertures 802*a*, 804*a* are located at opposing ends 802*e*, 804*e* of the support members 802, 804 (see, e.g., FIGS. 18 and 19A). In addition, a pair of apertures 821 are located proximate to the center (relative to the length) of each support member 802, 804. In some embodiments, the brace member 809 may be attached to each support member 802, 804 between the respective pairs of apertures 821 (see, e.g., FIG. 15B).

Mounting mechanisms 813 reside at opposing ends 802*e*, 804*e* of each support member 802, 804. In some embodiments, the mounting mechanisms 813 are configured to secure the platform frame 801 to the horizontal pipes or members 12 of the platform assemblies 100, 100', 100", 1000 described herein (see, e.g., FIG. 24B). In some embodiments, each mounting mechanism 813 may comprise a bracket 815 and a fastener 816 (e.g., a U-bolt). In some embodiments, and described in further detail below, the fastener 816 is configured to be received by an aperture 815*a* in the bracket 815 and a corresponding aperture 802*a*, 804*a* in a respective support member 802, 804 (see, e.g., FIG. 22).

As shown in FIGS. 15A-15B and FIGS. 15D-15F, the platform frame 801 of the T-arm assembly 800 may further comprise at least two grating edge members 803. The grating edge members 803 are coupled to the support members 802, 804. In addition, the platform frame 801 further comprises a grating 805 coupled to the grating edge members 803. The grating 805 may be supported by the grating edge members 803, the support members 802, 804, and the brace member 809, thereby providing a work platform on which a technician can stand.

Figure 15C:
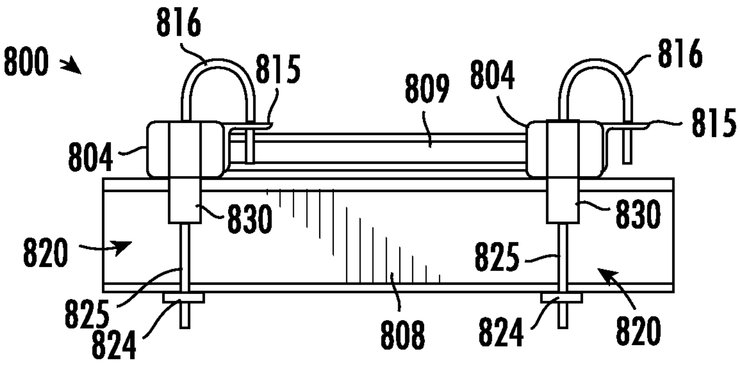
FIG. 15C is a side view of the T-arm assembly of FIG. 15A.
Figure 15D:
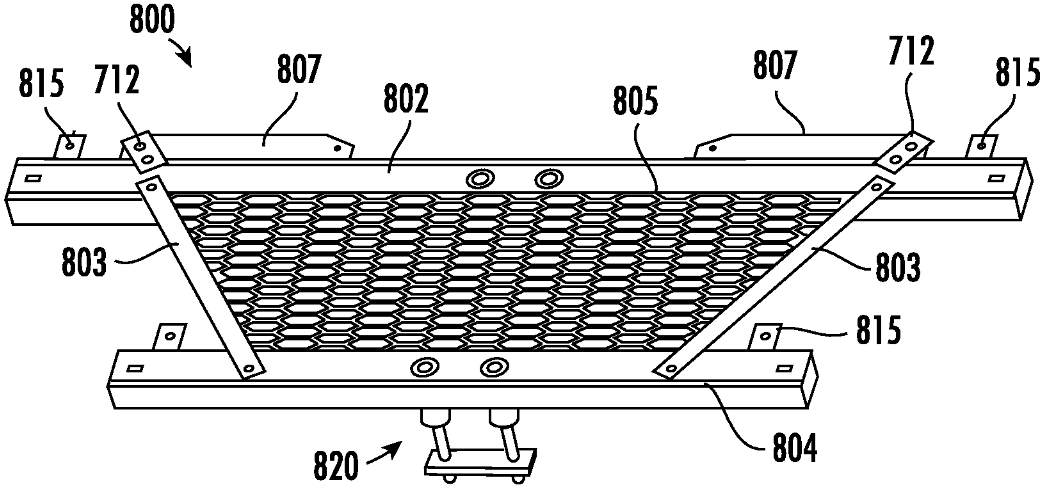
FIG. 15D is atop perspective view of a T-arm assembly of FIG. 15A with the adjustable arm member removed.
Figure 15E:
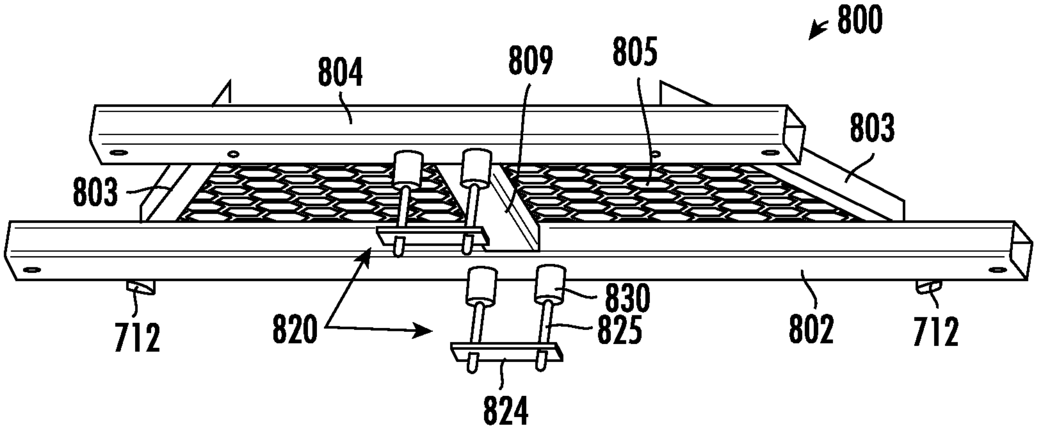
FIG. 15E is a bottom perspective view of the T-arm assembly of FIG. 15D.
Figure 15F:
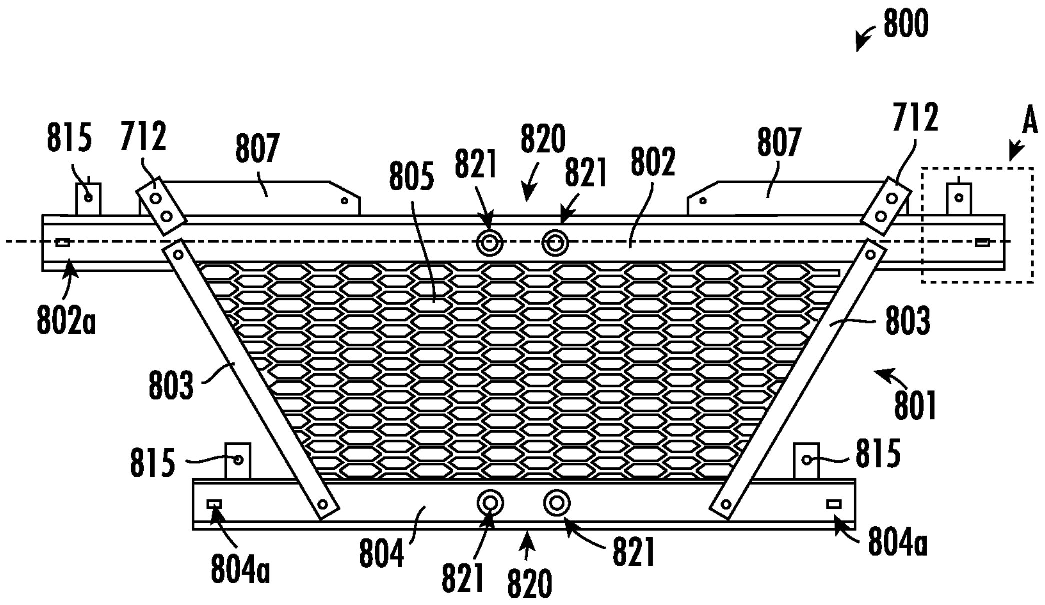
FIG. 15F is a top perspective view of the T-arm assembly of FIG. 15D.
Figure 16:
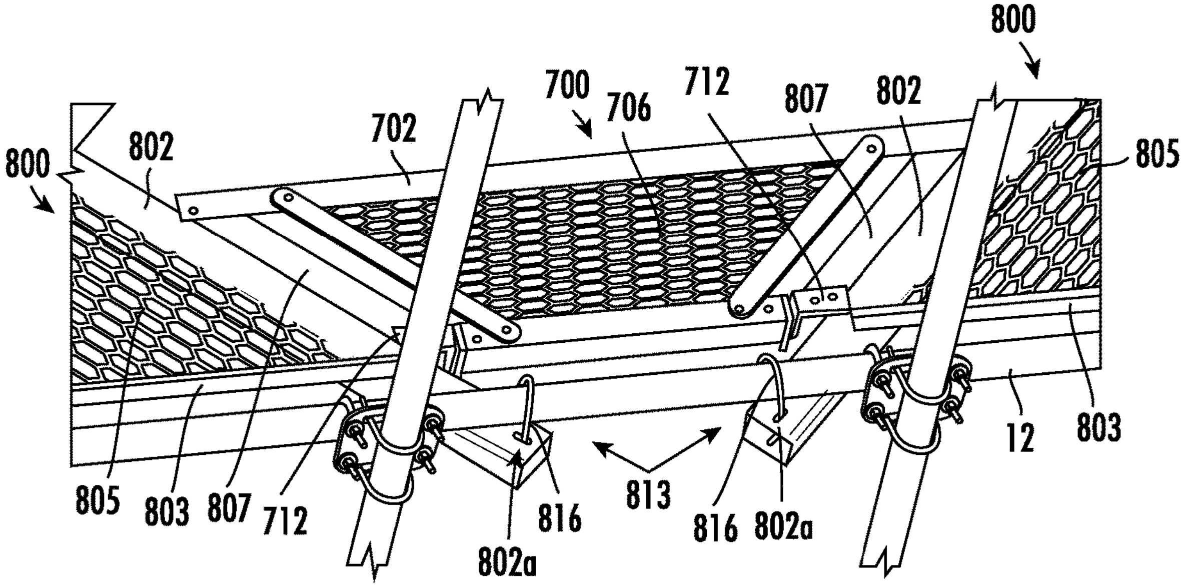
FIG. 16 is an enlarged perspective view of the grating section of FIG. 11A being supported by the flanged support members of the T-arm assembly of FIG. 15A.
Figure 17A:
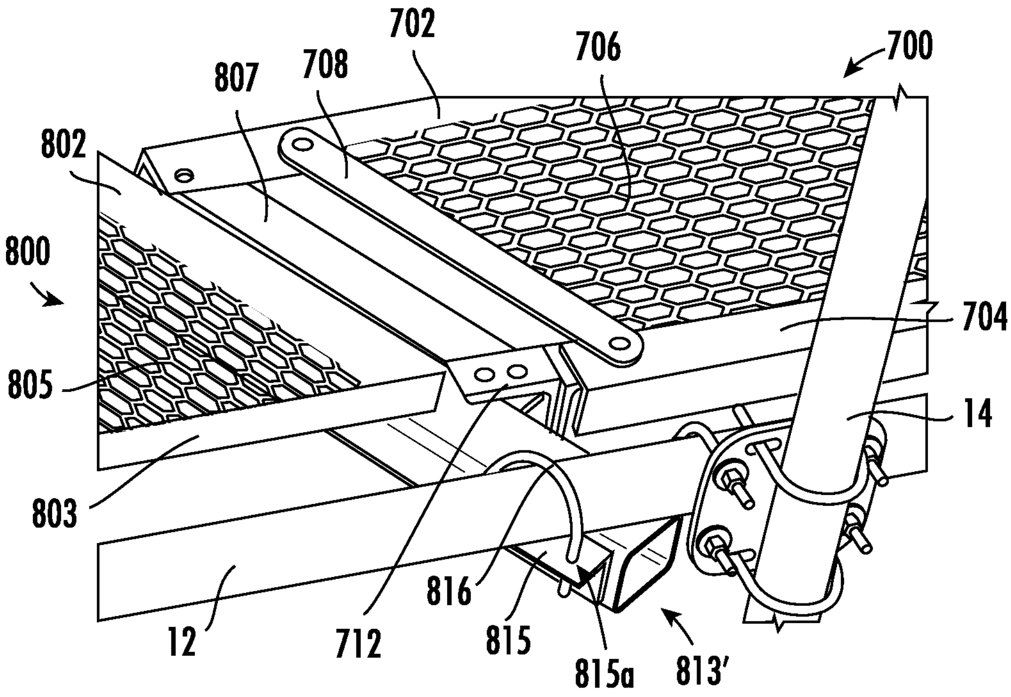
FIG. 17A is an enlarged top perspective view of a platform assembly according to embodiments of the present invention with the grating section in a "closed" position and the corresponding brackets having alternative positions than the brackets illustrated in FIGS. 12A-12B and FIG. 13A.
Figure 17B:
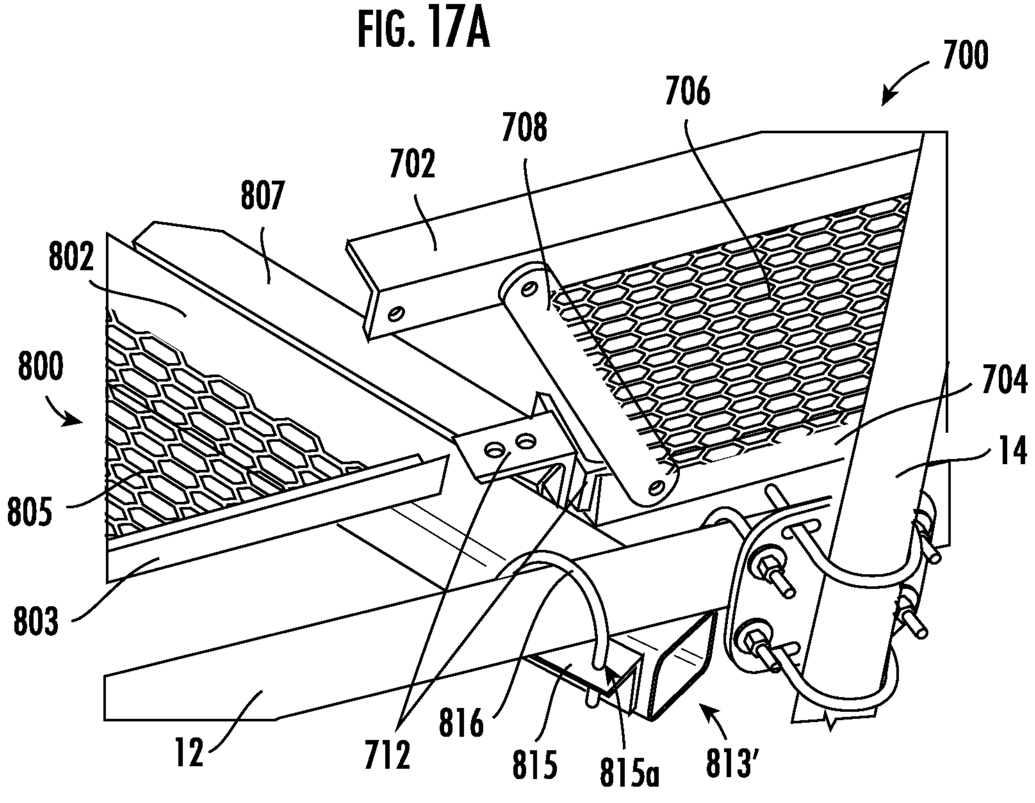
FIG. 17B is an enlarged top perspective view of a platform assembly according to embodiments of the present invention with the grating section in an "open" position and the corresponding brackets having alternative positions than the brackets illustrated in FIGS. 12C-12D and FIG. 13B.

As shown in FIG. 15D and FIG. 15F, in some embodiments, the platform frame 801 of the T-arm assembly 800 may further comprise one or more flanged support members 807 attached to, and extending outwardly from, support member 804. In some embodiments, the one or more flanged support members 807 include an L-shaped bracket 712 extending upwardly and over a top surface of the support member 802. As shown in FIG. 16, in some embodiments, the flanged support members 807 may provide additional support to the adjacent grating sections 700 described herein. In other embodiments, the bracket 712 may also provide support to the horizontal pipe 12 of the monopole platform assembly (e.g., assembly 1000 in FIGS. 24A-24C).

As shown in FIG. 15D, in some embodiments, the L-shaped bracket (or pivot bracket) 712 is oriented upward from the flanged support member 807 and/or support member 802 which allows for rotation of the movable grating section 300, 700 described herein (see also, e.g., FIG. 11A and FIG. 12B). In other embodiments, to reduce the possibility of a trip hazard, the brackets 712 may be rotated to be oriented downward from the flanged support member 807 and/or support member 802, i.e., such that no projection exists above the respective grating sections.

Figure 18A:
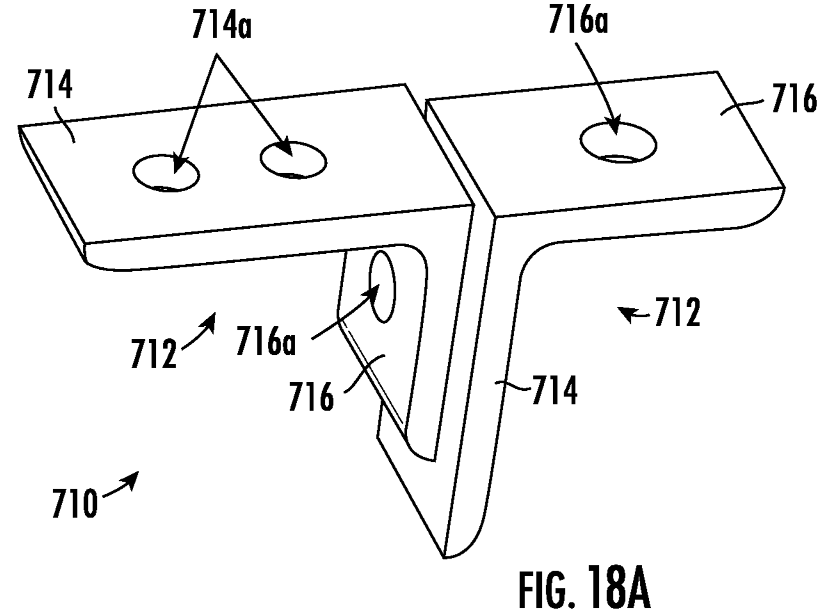
FIG. 18A illustrates the positions of the corresponding brackets when the grating section is in the closed position shown in FIG. 17A.
Figure 18B:
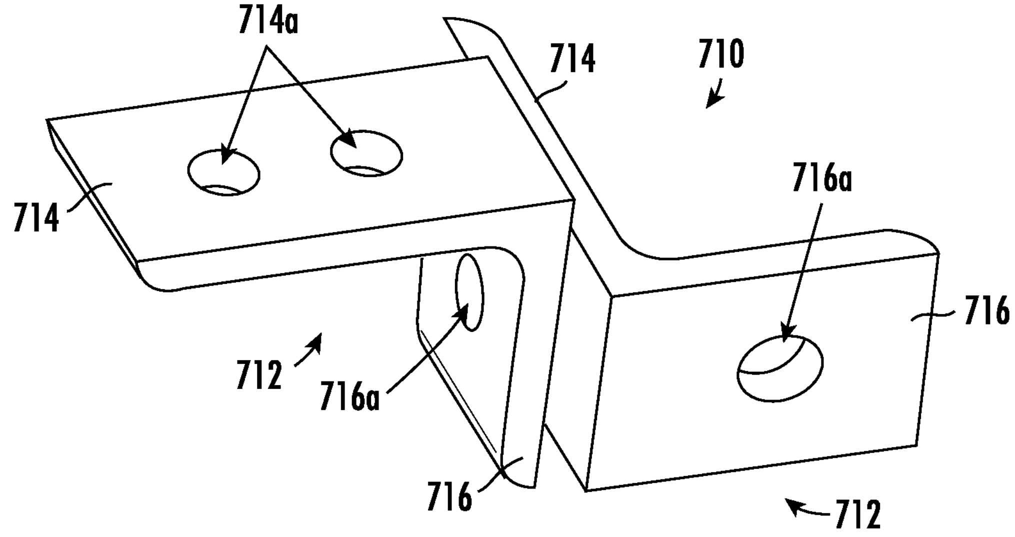
FIG. 18B illustrates the positions of the corresponding brackets when the grating section is in the open position shown in FIG. 17B.

For example, FIGS. 17A-17B and FIGS. 18A-18B illustrate the alternative configuration of the bracket assembly 710 (compared to the orientation shown in FIG. 13A-13B) in which the corresponding brackets 712 of the bracket assembly 710 are oriented downward relative to the flanged support member 807 and/or support member 802 (and grating section 700). As described above, and shown in FIGS. 13A-13B, in some embodiments, the respective longer and shorter segments 714, 716 of the brackets 712 may extend upwardly (i.e., when the grating section 700 is in a closed position). As shown in FIGS. 18A-18B, the longer segment 714 of one bracket 712 and the shorter segment 716 of the other bracket 712 extend downwardly relative to the frames 701, 801 of the respective grating section 700 and T-arm assembly 800 (i.e., when the grating section 700 is in a closed position). Rotating the brackets 712 to extend downwardly helps to eliminate a potential tripping hazard in the platform assembly 100, 100', 100", 1000 (i.e., no projections extend above the grating section 700 and/or T-arm assembly 800). FIG. 18A shows the orientation of the bracket assembly 710 when the grating section 700 is in the closed position. FIG. 18B shows the orientation of the bracket assembly 710 when the grating section 700 is in the open position.

In some embodiments, the components of the T-arm assembly 800 that define the platform frame 801 are formed of a weldment, except for the adjustable arm member 808 which, as described in further detail below, is allowed to slide below the platform frame 801. In some embodiments, the T-arm assembly 800 may comprise galvanized steel.

Figure 19:
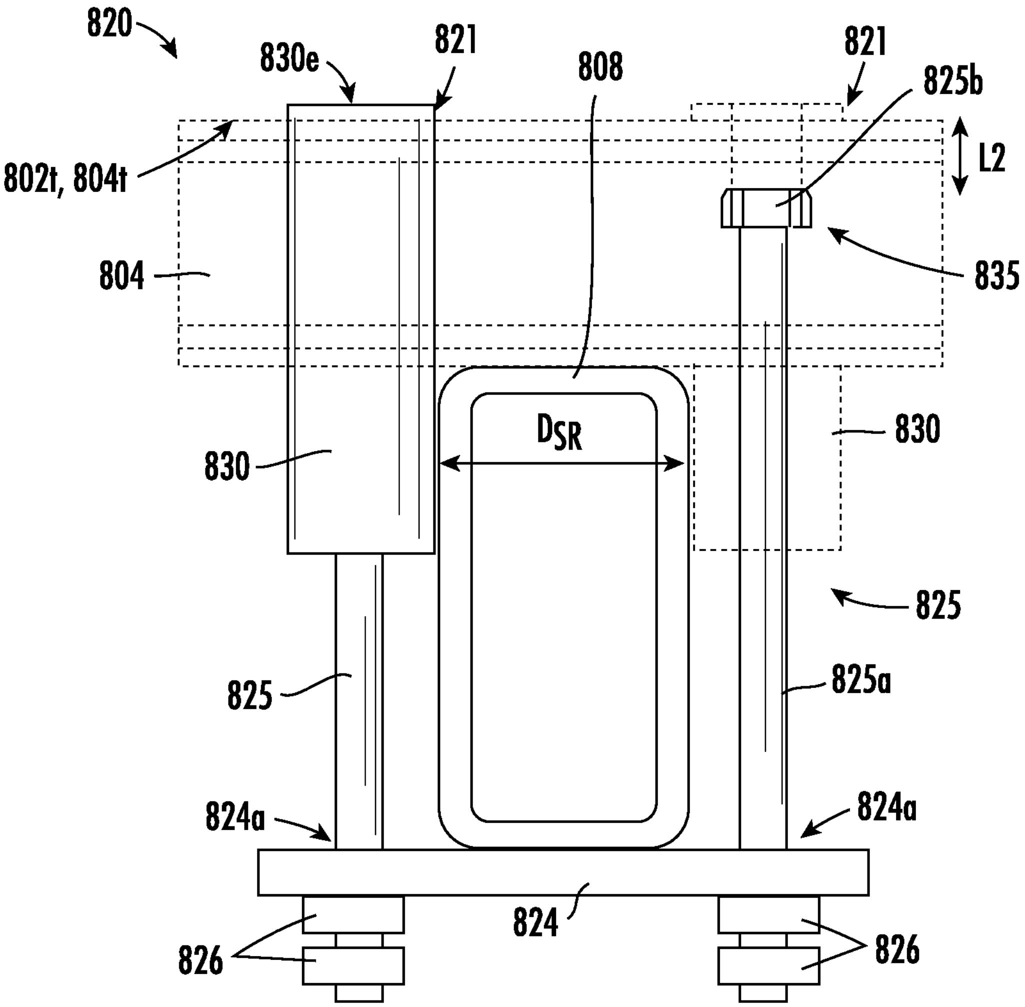
FIG. 19 is an enlarged front view of the T-arm assembly of FIG. 15A illustrating the adjustable arm member secured within a locking bracket.

As shown in FIGS. 15A-15E, the T-arm assembly 800 further includes a pair of locking brackets 820. Each locking bracket 820 is coupled to, and extends downwardly from, a respective support member 802, 804. An enlarged front view of one of the locking brackets 820 is illustrated in FIG. 19. Each locking bracket 820 includes a pair of support rods 830, a pair of securing members 825, a lower bracket member 824, and a plurality of nuts 826. Each support rod 830 may be received through, and secured within, a respective aperture 821 in the support members 802, 804. As shown in FIG. 15C (and FIG. 19), the support rods 830 extend through the respective support members 802, 804. As described in further detail below, each support rod 830 is configured to receive a respective securing member 825 (see, e.g., FIG. 19 and FIGS. 20A-20B). The respective lower bracket members 824 are secured to the support rods 830 (and corresponding support member 802, 804) via the pair of securing members 825. In some embodiments, the securing members 825 are bolts, threaded rods, or the like. Each securing member 825 is configured to be received through a bore 832 in the support rods 830 and corresponding aperture 824*a* in the lower bracket member 824. At least a pair of nuts 826 secure and hold the lower bracket member 824 to the securing members 825. In some embodiments, an additional pair of nuts 826 may be used to further secure the lower bracket member 824 to the securing members 825. The additional pair of nuts 826 may help prevent loosening of the lower bracket member 824 from the securing members 825.

Figure 20A:
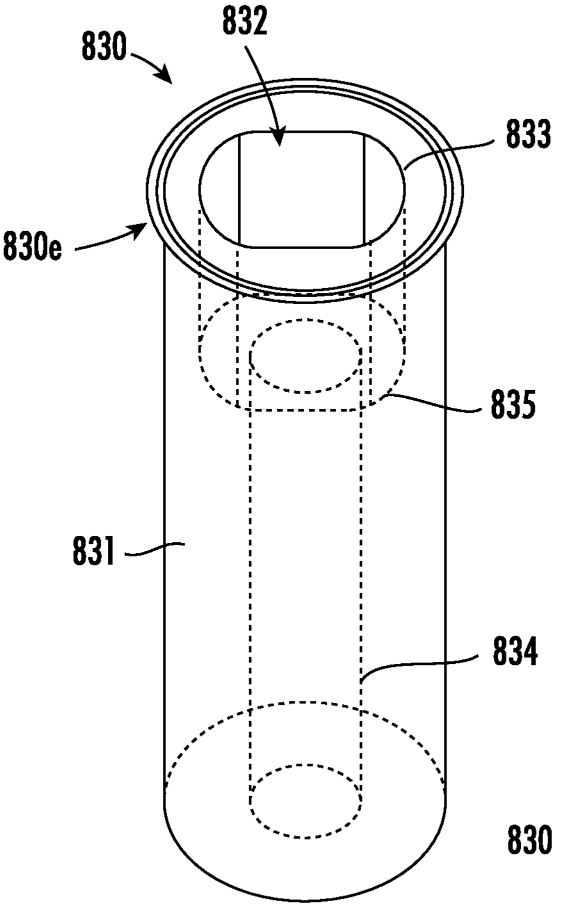
FIG. 20A is a perspective view of a support rod of the T-arm assembly of FIG. 15A according to embodiments of the present invention.
Figure 20B:
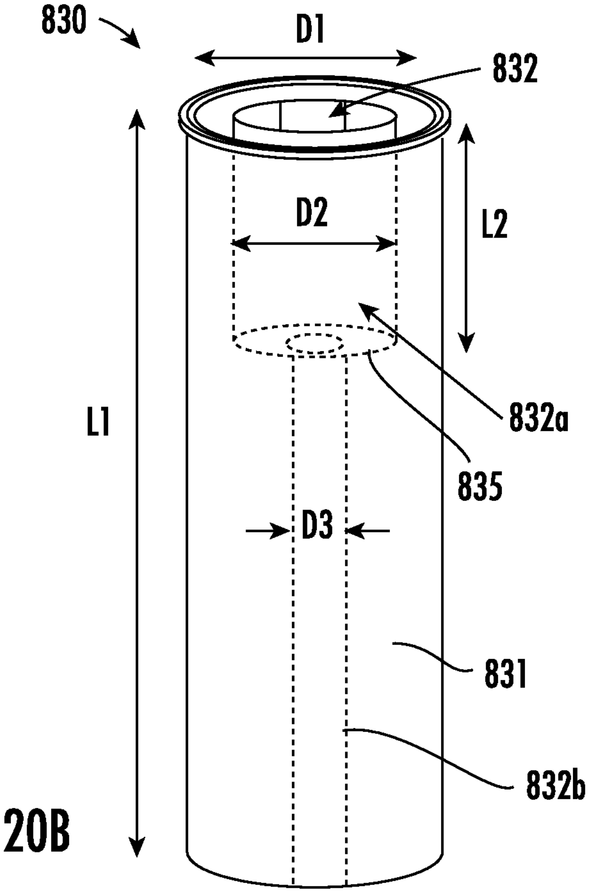
FIG. 20B is a side view of the support rod of FIG. 20A.

One of the support rods 830 is illustrated in FIGS. 20A-20B. As shown in FIGS. 20A-20B, the support rods 830 each have a main body 831 having a length (L1). In some embodiments, the main body 831 is cylindrical and has a diameter (D1). However, in other embodiments, the main body 831 may have a different cross-sectional shape such as rectangular or square. The bore 832 extends the length (L1) of the main body 831. As discussed above, the bore 832 is configured to receive a respective securing member 825. As shown in FIG. 20B, in some embodiments, the bore 832 has a first section 832*a* having a first diameter (D2) and a second section 832*b* having a second diameter (D3). The diameter (D3) of the second section 832*b* is less than the diameter (D2) of the first section 832*a*. The transition from the first section 832*a* to the second section 832*b* (i.e., the difference in diameters of the two sections 832*a*, 832*b*) forms a shoulder 835 within the main body 831 of the support rod 830. In some embodiments, the first section 832*a* of the bore 832 may have a generally elliptical cross-section and the second section 832*b* of the bore 832 may have a circular cross-section. In other embodiments, the first section 832*a* of the bore 832 may also have a circular cross-section.

As shown in FIG. 19 and FIG. 20A, in some embodiments, each support rod 830 may further comprise a flanged top edge 830*e*. In some embodiments, the flanged top edge 830*e* of the support rod 830 may have a larger diameter than the diameter of the apertures 821 in the support members 802, 804. Thus, when the support rod 830 is inserted into an aperture 821 during manufacture, the top edge 830*e* contacts a top surface 802*t*, 804*t* of the support member 802, 804, thereby prohibiting the entire support rod 830 from being pulled through the aperture 821 and securing the support rods 830 to the support members 802, 804. In some embodiments, the support rods 830 are otherwise secured to the support members 802, 804, for example, via welding. The larger diameter (D1) of the support rod 830 allows the flanged top edge 830*e* to be welded into the support member 802, 804 and is configured to support the support rod 830 when the securing members 825 (e.g., clamping bolts) are tightened.

As shown in FIG. 19, a rod or bolt section 825*a* of the securing member 825 is received through the first and second sections 832*a*, 832*b* of the bore 832 of the support rod 830 until a head 825*b* of the securing member 825 contacts the shoulder 835. The diameter or size of the head 825*b* of the securing member 825 is larger than the diameter (D3) of the second section 832*b*, thereby prohibiting the securing member 825 from advancing completely through the bore 832 of the support rod 830. The shoulder 835 resides at a distance (L2) below the top edge 830*e* of the support rod 830 which allows the entire head 825*b* of the securing member 825 to be positioned within the first section 832*a* of the bore 832 and below a top surface 802*t*, 804*t* of the corresponding support member 802, 804 (see, e.g., FIG. 16).

As shown in FIG. 19, the support rods 830 are spaced apart a sufficient distance ($D_{SR}$) (i.e., the distance between the outer surfaces of a pair of support rods 830) to accommodate the width of the adjustable arm member 808 therebetween and provide a rail path for the adjustable arm member 808 to slide (e.g., during adjustment and positioning against a monopole 10). The adjustable arm member 808 is configured to extend between the support members 802, 804 and the lower bracket members 824 of the locking brackets 820 (see, e.g., FIG. 15A, FIG. 19, and FIG. 24C). The adjustable arm member 208 is slidable (i.e., adjustable) within the space between the support members 802, 804 and the locking brackets 820 to accommodate different diameters along the height of the monopole 10. As shown in FIGS. 17 and 20A, once the adjustable arm member 808 is moved (slid) to a desired position (i.e., the adjustable arm member 808 and mounting plate 806 are positioned against the monopole 10), the securing features 825 are tightened (i.e., via nuts 826) to move the lower bracket member 824 against the adjustable arm member 808 and to clamp the adjustable arm member 808 between support members 802, 804 and corresponding lower bracket members 824 of the locking brackets 820, thereby securing the adjustable arm member 808 in the desired position with respect to the platform frame 801.

Figure 21A:
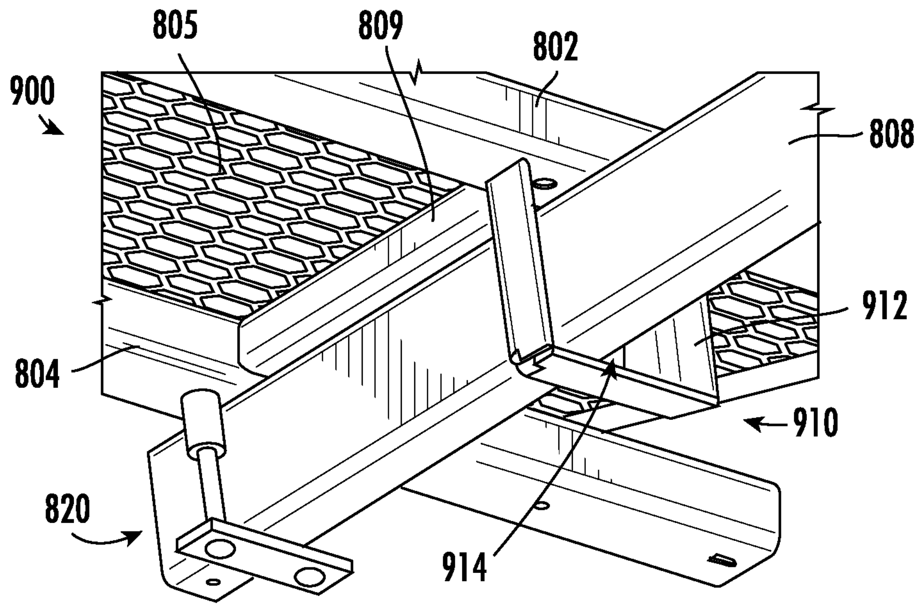
FIG. 21A is an enlarged bottom perspective view of a T-arm assembly having an alternative locking bracket according to embodiments of the present invention.
Figure 21B:
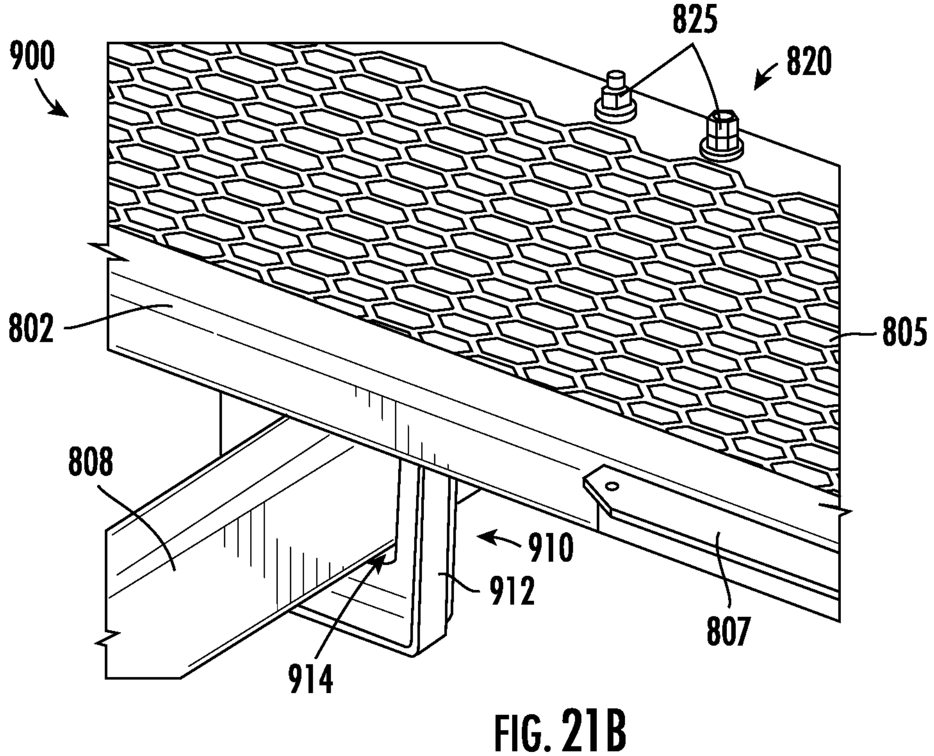
FIG. 21B is an enlarged rear perspective view of the T-arm assembly of FIG. 21A.

Referring now to FIGS. 21A-21B, an alternative T-arm assembly 900 is illustrated in which one of the locking brackets 820 is replaced with a plate member 910. The other properties and/or features of the T-arm assembly 900 may be as described above in reference to the T-arm assembly 800 shown in FIGS. 15A-15F and duplicate discussion thereof may be omitted herein for the purposes of discussing FIGS. 21A-21B.

As shown in FIGS. 21A-21B, the plate member 910 is coupled to the support member 802. In some embodiments, the plate member 910 may be welded to the support member 802. The plate member 910 has a main body 912 that, when coupled to the support member 802, defines an aperture 914 that is sized and configured to allow the adjustable arm member 808 to slide therethrough. The adjustable arm member 808 is also received through a locking bracket 820 coupled to the other support member 804 as described herein, thereby securing the adjustable arm member 808 to the platform frame 801. In some embodiments, the plate member 910 may further comprise a clamp mechanism (e.g., similar to the lower bracket member 824) to further secure the adjustable arm member 808 to the platform frame 801 of the T-arm assembly 800.

Figure 22:
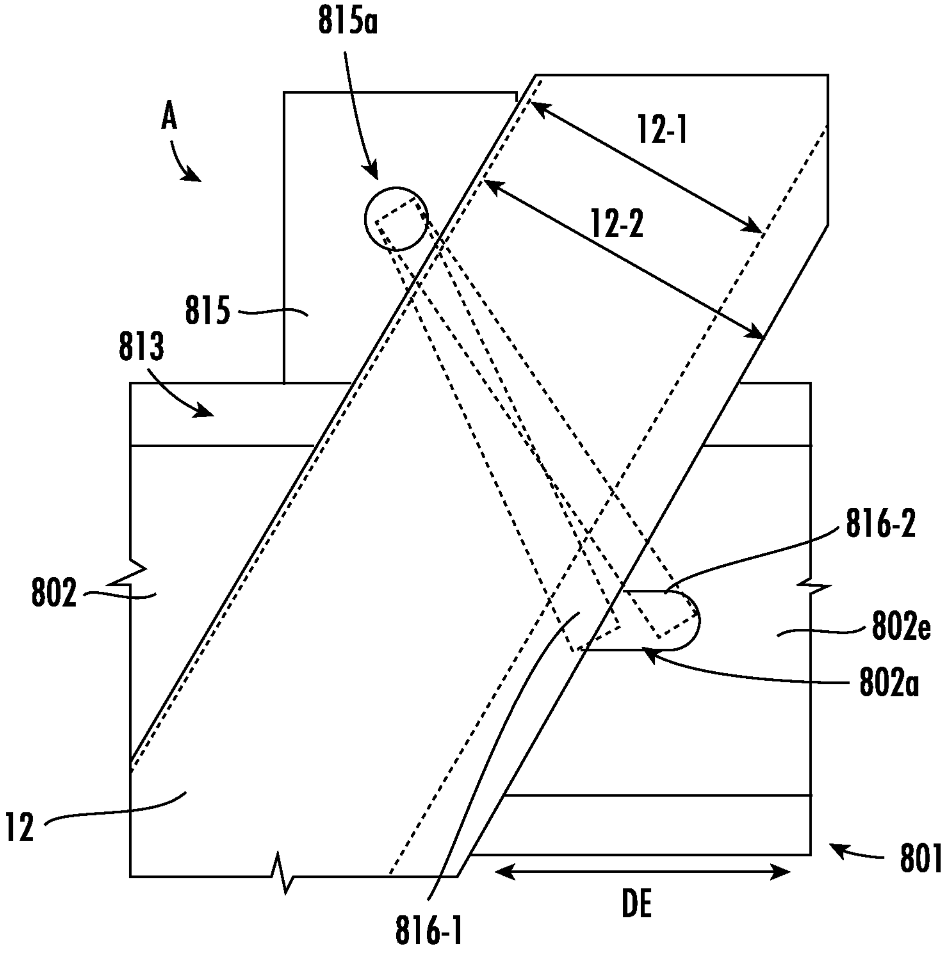
FIG. 22 is an enlarged top view of the section labelled "A" in FIG. 15F illustrating how the slotted aperture within the support member allows the T-arm assembly to accommodate different diameter face (i.e., horizontal) pipes of a monopole platform assembly.

FIG. 22 is an enlarged top view of the section labelled "A" in FIG. 15F and illustrates how the mounting mechanisms 813 of the T-arm assembly 800 of the present invention may accommodate horizontal pipes or members 12 of the platform assemblies described herein having different diameters (i.e., 12-1, 12-2). As described above, each mounting mechanism 813 comprises a bracket 815 having an aperture 815*a* and a fastener 816. In some embodiments, the fastener 816 is a U-bolt. In addition, each support member 802, 804 has an elongated (i.e., slotted) aperture 802*a*, 804*a* at opposing ends. Each slotted or elongated aperture 802*a*, 804*a* corresponds to a respective mounting mechanism 813. The fastener 816 (e.g., U-bolt) is configured to be received by the aperture 815*a* in the bracket 815 and the slotted or elongated aperture 802*a*, 804*a* in the respective support member 802, 804 to secure the horizontal pipe or member 12 to the platform frame 801. As shown in FIG. 22, the slotted aperture 802*a* allows the position of the fastener 816-1, 816-2 to be adjusted in order to accommodate horizontal pipes 12 having different diameters 12-1, 12-2 (i.e., fastener position 816-1 within the slotted aperture 802*a* for a horizontal pipe 12 having a first (smaller) diameter 12-1 and fastener position 816-2 for a horizontal pipe 12 having a second (larger) diameter 12-2).

Figure 23A:
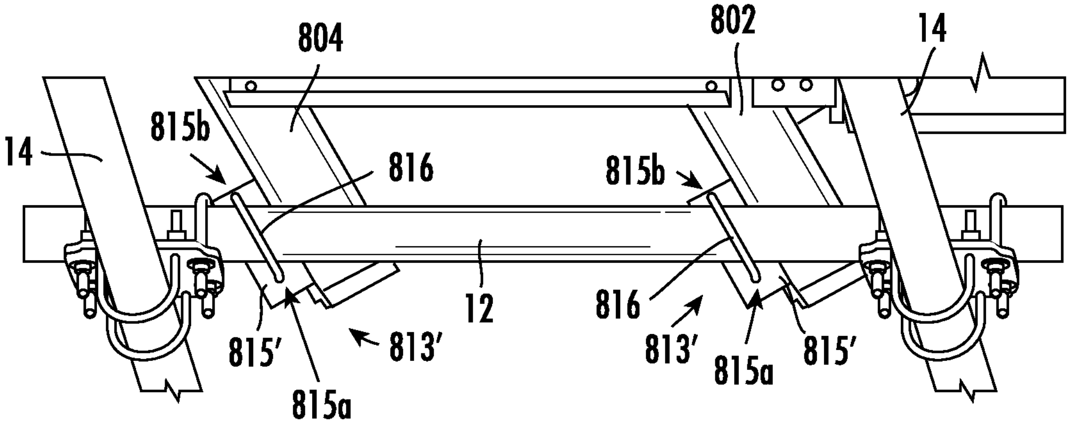
FIG. 23A is an enlarged top view illustrating the horizontal pipe of a monopole platform assembly secured to the T-arm assembly utilizing an alternative bracket according to embodiments of the present invention.
Figure 23B:
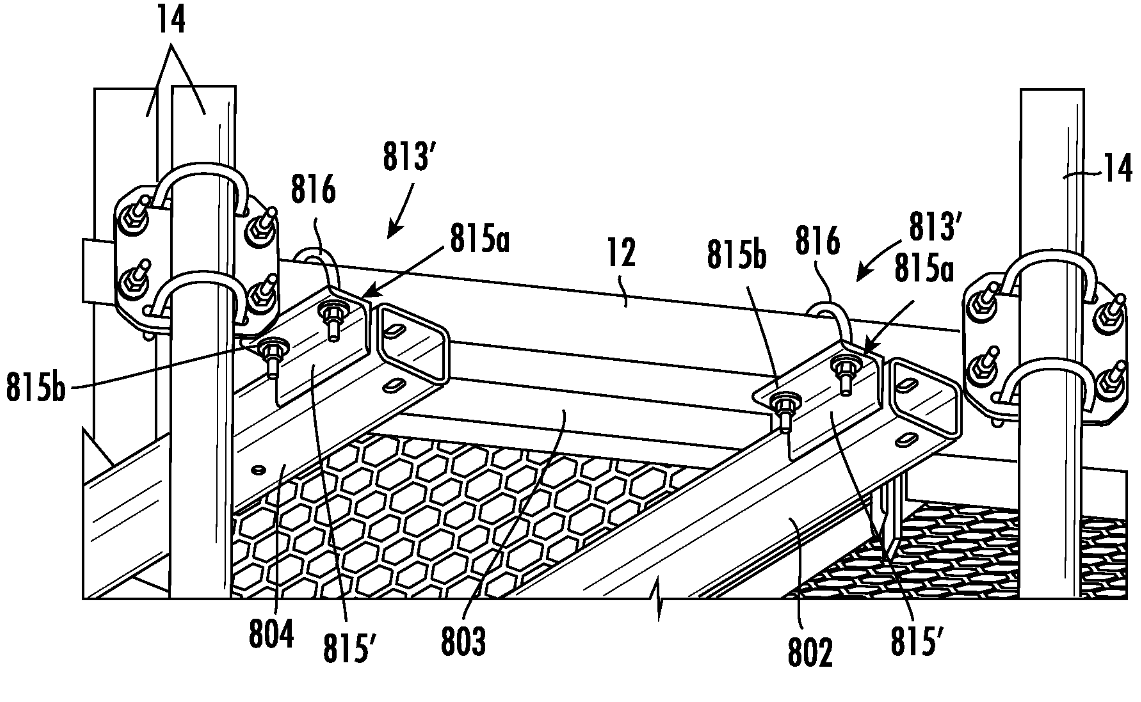
FIG. 23B is an enlarged bottom perspective view of the assembly of FIG. 23A.
Figure 23C:
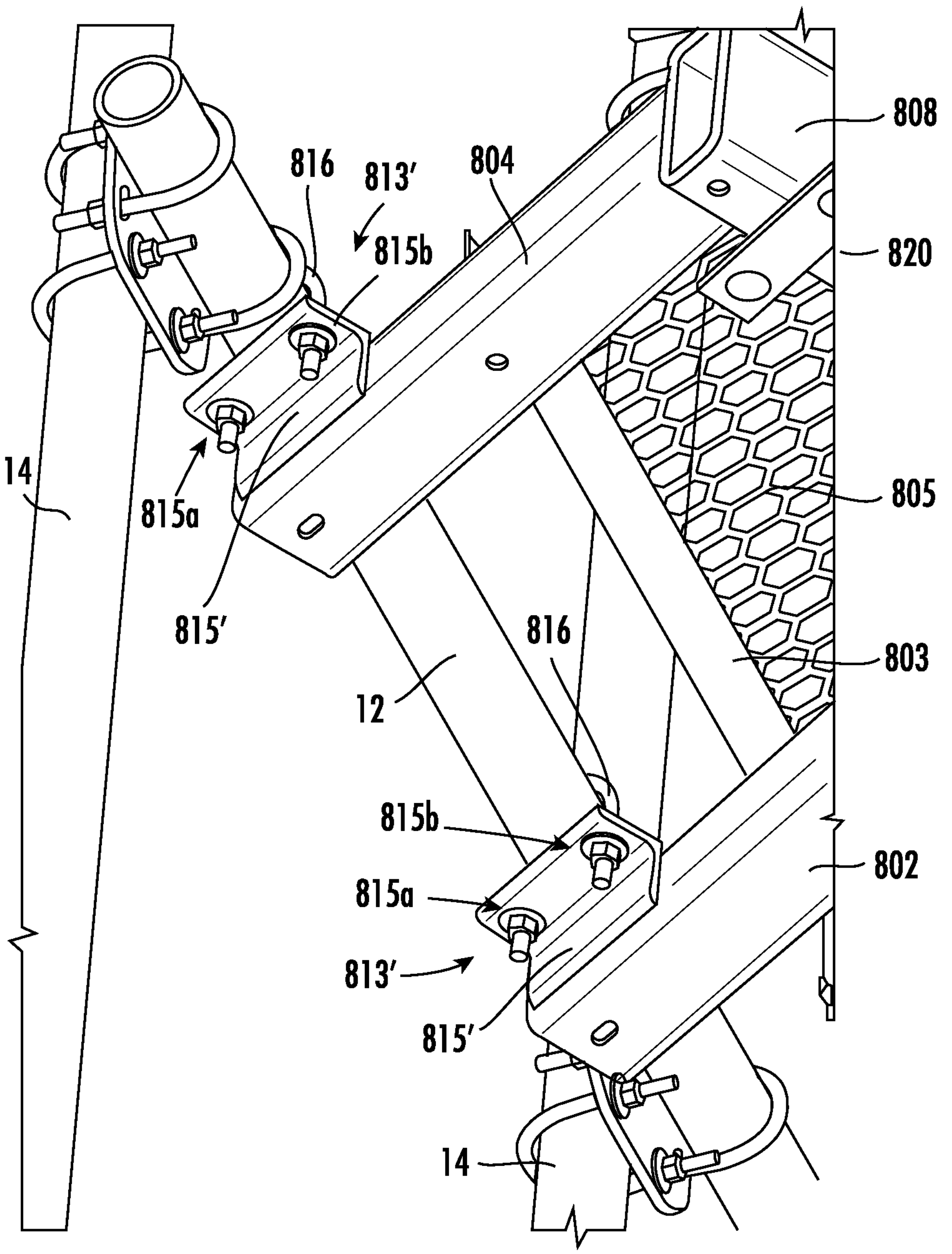
FIG. 23C is another enlarged bottom perspective view of the assembly of FIG. 23A.

Referring to FIGS. 23A-23C, in some embodiments, the T-arm assembly 800 may include alternative mounting mechanisms 813' in which the brackets 815' include a first aperture 815*a* and a second slotted or elongated aperture 815*b*. As shown in FIGS. 23A-23C, instead of a portion of the fastener 816-1, 816-2 being received through a slotted or elongated aperture 802*a*, 804*a* in the respective support member 802, 804, the fastener 816-1, 816-2 may be received by the apertures 815*a*, 815*b* in the bracket 815' to secure the horizontal pipe or member 12 to the platform frame 801. Similar to the slotted or elongated aperture 802*a*, 804*a* in the respective support members 802, 804, the slotted or elongated aperture 815*b* in the bracket 815' allows the position of the fastener 816-1, 816-2 to be adjusted in order to accommodate horizontal pipes 12 having different diameters 12-1, 12-2.

Figure 24A:
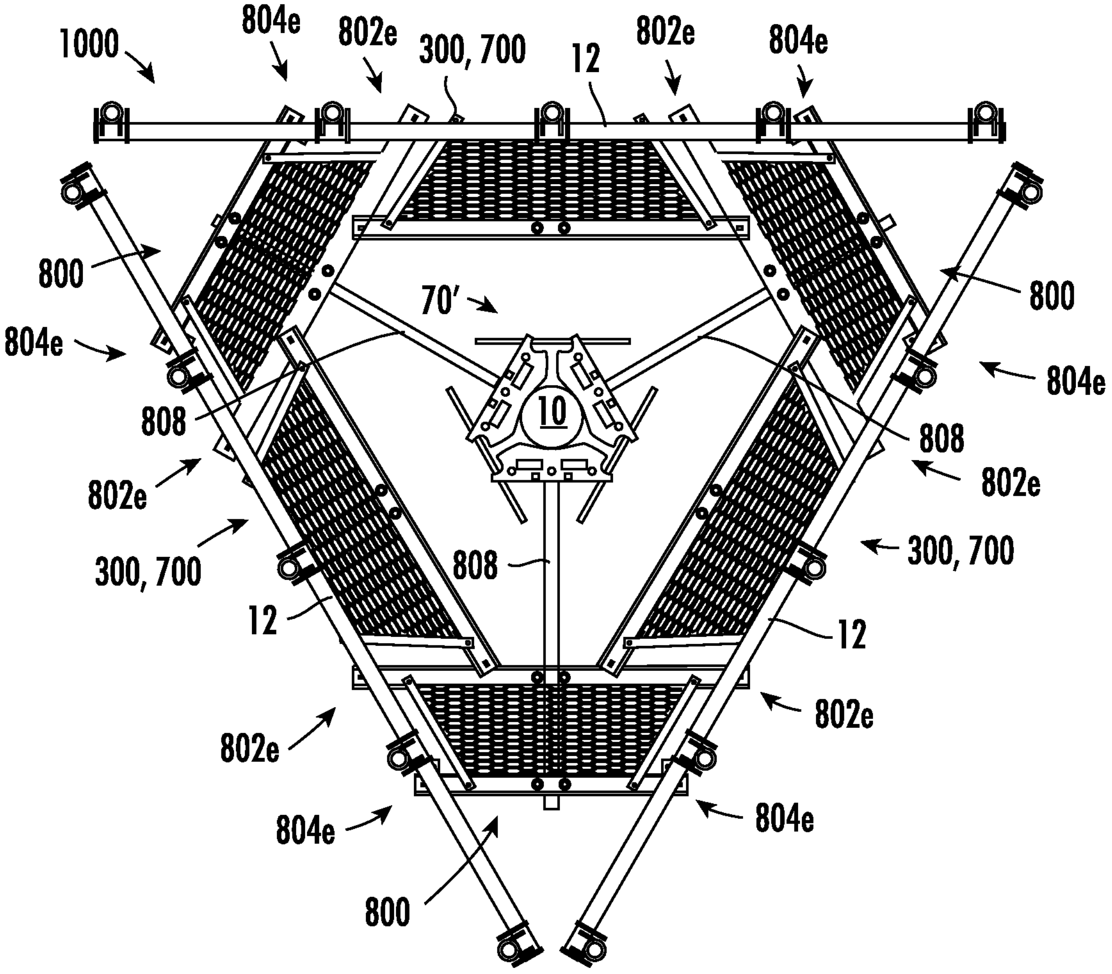
FIG. 24A is a top view of a monopole platform assembly according to embodiments of the present invention utilizing the T-arm assembly of FIG. 15A.

In addition, in some embodiments, and shown in FIG. 19 and FIG. 24A, opposing ends 802*e*, 804*e* of the support members 802, 804 may extend outwardly a sufficient distance (DE) such that the horizontal pipe 12 can be supported by and/or engage with the support members 802, 804 (i.e., the horizontal pipe 12 is sits on top of and is secured to the top surface 802*t*, 804*t* of the support members 802, 804). In some embodiments, the distance (DE) that the ends 802*e*, 804*e* of the support members 802, 804 extend outwardly is at least equal to or greater than the outer diameter 12-1, 12-2 of the horizontal pipe 12 to be supported. See also, e.g., U.S. Patent Application Publication No. 2023/0024333 to Ojha et al., the disclosure of which is hereby incorporated by reference in its entirety.

Figure 24B:
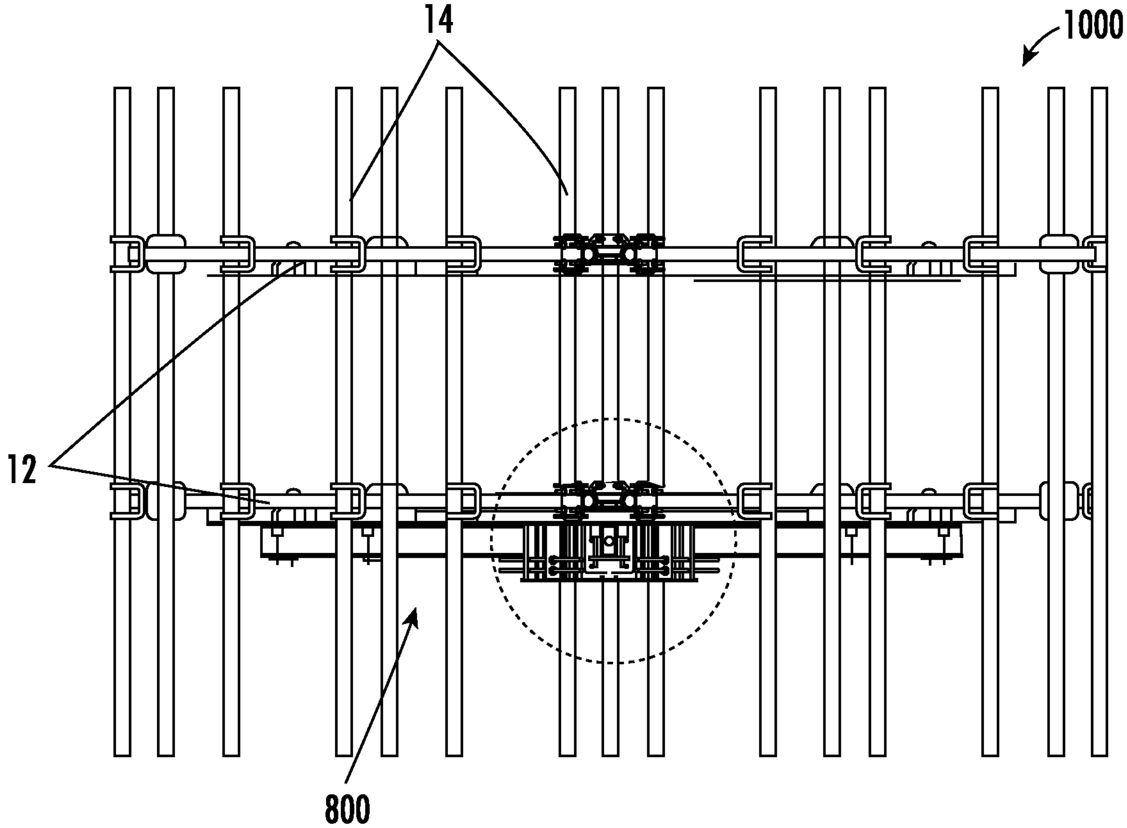
FIG. 24B is a side view of the monopole platform assembly of FIG. 24A.
Figure 24C:
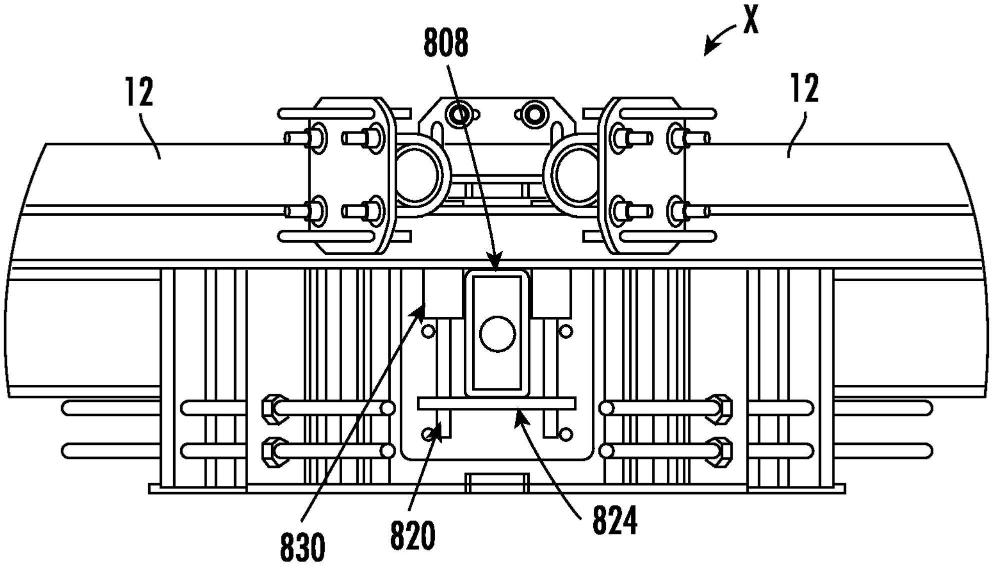
FIG. 24C is an enlarged side view of the section labelled "X" in FIG. 24B.

Referring to FIGS. 24A-24C, a platform assembly 1000 according to embodiments of the present invention is illustrated. Properties and/or features of the platform assembly 1000 may be as described above in reference to the platform assemblies 100, 100', 100" of the present invention described herein and duplicate discussion thereof may be omitted herein for the purposes of discussing FIGS. 24A-24C. The platform assembly 1000 utilizes the T-arm assembly 800 described herein. In some embodiments, the platform assembly 1000 may further comprise the grating sections (or walkway modules) 300, 700 described herein. As shown in FIG. 24A, as discussed above, the ends 802*e*, 804*e* of the support members 802, 804 extend outwardly such that the horizontal pipe 12 can be support by and/or engage with the support members 802, 804.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A platform assembly, the platform assembly comprising a plurality of T-arm assemblies, each T-arm assembly comprising:
- a platform frame comprising
  - a pair of support members; and
  - a grating;
- a pair of locking brackets, each locking bracket comprising a pair of support rods coupled to a respective support member and a lower bracket member extending between each pair of support rods; and
- an adjustable arm member, the adjustable arm member configured to slide between the support rods of each pair of locking brackets and relative to the platform frame to accommodate for different diameters along a monopole,
- wherein the lower bracket member of each locking bracket is configured to move relative to the corresponding support rods to secure the adjustable arm member in a desired position relative to the platform frame.

2. The platform assembly of claim 1, further comprising a mounting plate coupled to one end of the adjustable arm member, the mounting plate configured to be secured to a mounting structure.

3. The platform assembly of claim 1, further comprising a plurality of mounting mechanisms, each mounting mechanism coupled to opposing ends of each support member.

4. The platform assembly of claim 3, wherein each mounting mechanism comprises a bracket and a fastener, wherein the fastener is configured to be received by an aperture in the bracket and a corresponding aperture in a respective support member to secure the platform frame to a horizontal pipe of an antenna assembly.

5. The platform assembly of claim 3, wherein the corresponding aperture in the support member is an elongated slot configured to accommodate horizontal pipes having different diameters.

6. The platform assembly of claim 3, wherein opposing ends of the support members extend outwardly a sufficient distance such that the horizontal pipe can be supported by the support members.

7. The platform assembly of claim 6, wherein the distance that the ends of the support members extend outwardly is at least equal to or greater than an outer diameter of the horizontal pipe to be supported.

8. The platform assembly of claim 1, wherein each locking bracket further comprises:
- a pair of securing members, each securing member received through a bore in a respective support rod and a corresponding aperture in the lower bracket member; and
- a plurality of nuts configured to secure the lower bracket member to the securing members,
- wherein adjustment of the pair of securing members and lower bracket member coordinate to secure the adjustable arm member to the platform frame.

9. The platform assembly of claim 8, wherein each support rod has a main body having a length, wherein the bore extends the length of the main body and comprises a first section having a first diameter and a second section having a second diameter that is less than the first diameter to form an annular shoulder within the main body of the support rod.

10. A platform assembly, the platform assembly comprising:
- a plurality of T-arm assemblies, each T-arm assembly comprising:
  - a platform frame comprising:
    - a pair of support members; and
    - a grating;
- a pair of locking brackets, each locking bracket coupled to a respective support member;
- an adjustable arm member, the adjustable arm member configured to slide between the pair of locking brackets and relative to the platform frame to accommodate for different diameters along a monopole, wherein each locking bracket is configured to secure the adjustable arm member in a desired position relative to the platform frame;
- one or more grating sections, each grating section positioned between two adjustable T-arm assemblies; and
- a pivot bracket assembly residing between at least one or more grating sections and the two adjacent adjustable T-arm assemblies, each pivot bracket assembly including an identical pair of L-shaped main bracket members connected with a first fastener to form a rotational axis, thereby allowing the grating section to pivoted upwardly and fixed in an opened position relative to the two adjacent adjustable T-arm assemblies,
- wherein each L-shaped main bracket member has a first longer segment and a second shorter segment, the first longer segment comprises a first and a second aperture and the second shorter segment comprises a third aperture, wherein the third aperture of one of the main bracket members is configured to align with the first aperture of the other main bracket member and the first fastener is received through the aligned apertures to form the rotational axis.

11. The platform assembly of claim 10, wherein one main bracket member from each bracket assembly is secured to the grating section and the other main bracket member is secured to the adjacent T-arm assembly.

12. The platform assembly of claim 10, wherein when the grating section is pivoted about the rotational axis into the opened position, a second fastener is received through the second aperture in the first longer segment to lock the grating section in the opened position.

13. The platform assembly of claim 10, wherein each T-arm assembly further comprises a mounting plate coupled to one end of the adjustable arm member, the mounting plate configured to be secured to a mounting structure.

14. The platform assembly of claim 10, wherein the platform assembly is capable of being utilized in a tri-platform assembly, a quad-platform assembly, and a hex-platform assembly.

15. The platform assembly of claim 10, wherein each grating section is pivotably coupled to the T-arm assemblies.

16. The platform assembly of claim 10, wherein the platform frame of the T-arm assembly further comprises a plurality of mounting mechanisms, each mounting bracket coupled to opposing ends of each support member.

* * * * *